(12) United States Patent
Xie et al.

(10) Patent No.: US 12,237,764 B2
(45) Date of Patent: Feb. 25, 2025

(54) SWITCHING METHODS FOR REGULATING RESONANT SWITCHED-CAPACITOR CONVERTERS

(71) Applicant: The Regents of the University of California, Oakland, CA (US)

(72) Inventors: Wenhao Xie, Irvine, CA (US); Keyue Smedley, Aliso Viejo, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 276 days.

(21) Appl. No.: 17/781,696

(22) PCT Filed: Dec. 2, 2020

(86) PCT No.: PCT/US2020/062874
§ 371 (c)(1),
(2) Date: Jun. 1, 2022

(87) PCT Pub. No.: WO2021/113351
PCT Pub. Date: Jun. 10, 2021

(65) Prior Publication Data
US 2023/0006548 A1 Jan. 5, 2023

Related U.S. Application Data

(60) Provisional application No. 62/942,651, filed on Dec. 2, 2019.

(51) Int. Cl.
*H02M 3/07* (2006.01)
*H02M 1/00* (2006.01)
*H02M 3/00* (2006.01)

(52) U.S. Cl.
CPC ........... *H02M 3/07* (2013.01); *H02M 1/0058* (2021.05); *H02M 3/01* (2021.05)

(58) Field of Classification Search
CPC ......... H02M 3/07; H02M 1/0058; H02M 3/01
(Continued)

(56) References Cited

U.S. PATENT DOCUMENTS 8,134,351 B2  3/2012  Cuk
10,027,223 B1  7/2018  Zhang et al.
(Continued)

FOREIGN PATENT DOCUMENTS

CN  109617407 A  4/2019
WO  2018134827 A1  7/2018

OTHER PUBLICATIONS

Cheng K.W.E., "New Generation of Switched Capacitor Converters", PESC 98 Record, 29th Annual IEEE Power Electronics Specialists Conference, May 1998.
(Continued)

*Primary Examiner* — Yemane Mehari
(74) *Attorney, Agent, or Firm* — Thomas | Horstemeyer, LLP

(57) ABSTRACT

Various examples are provided related to switching methods for regulating resonant switched-capacitor converters (RSCCs). In one example, a method includes operating switches of the RSCC in a repeated asymmetric sequence of switching states per switching cycle. The repeated asymmetric sequence can include at least three switching states selected from five defined switching states including an idle state. For example, repeated asymmetric sequence can consist of four switching states selected from the five defined switching states. In another example, a method includes operating switches of the RSCC in a repeated sequence of switching states per switching cycle. The repeated sequence can include six switching states selected from five defined switching states with at least one of the five defined switching states occurs twice in the six switching states. For
(Continued)

example, the repeated sequence can consist of each of the five defined switching states with the idle state occurring twice.

22 Claims, 15 Drawing Sheets

(58) Field of Classification Search
USPC .......................................................... 323/271
See application file for complete search history.

(56) References Cited

U.S. PATENT DOCUMENTS

| | | | |
|---|---|---|---|
| 2015/0009734 A1* | 1/2015 | Stahl ................. | H02M 7/53871 |
| | | | 363/98 |
| 2015/0188405 A1* | 7/2015 | Ben-Yaakov ........... | H02M 3/01 |
| | | | 323/312 |
| 2015/0263629 A1 | 9/2015 | Stuler et al. | |
| 2016/0028302 A1* | 1/2016 | Low ...................... | H02M 3/073 |
| | | | 363/50 |
| 2017/0201177 A1 | 7/2017 | Kesarwani et al. | |
| 2019/0372454 A1* | 12/2019 | Rainer .................. | H02M 3/158 |

OTHER PUBLICATIONS

International Search Report for PCT/US20/62874 mailed Dec. 2, 2020.

* cited by examiner

| Table 1 Fibonacci Sequence | | | | | | | | | |
|---|---|---|---|---|---|---|---|---|---|
| n= | 2 | 3 | 4 | 5 | 6 | 7 | 8 | 9 | ... |
| f(n)= | 2 | 3 | 5 | 8 | 13 | 21 | 34 | 55 | ... |

FIG. 11A

Table II  Definition of Operation States

| RSC examples | The conducting switches in | | | | |
|---|---|---|---|---|---|
| | State 1 | State 2 | State 3 | State 4 | State 5 |
| Basic RSCC (FIG. 4) & Inverse polarity RSCC (FIG. 5) | $Q_2, Q_3$ | $Q_2, Q_4$ | $Q_1, Q_4$ | $Q_1, Q_3$ | Idle |
| Ladder RSCC (FIG. 6) & Dickson RSCC (FIG. 8) | $Q_2, Q_3, \& Q_5, Q_7, \ldots Q_{2n-1}$ | $Q_2, Q_4, \& Q_6, Q_8, \ldots Q_{2n}$ | $Q_1, Q_4, \& Q_6, Q_8, \ldots Q_{2n}$ | $Q_1, Q_3, \& Q_5, Q_7, \ldots Q_{2n-1}$ | Idle |
| RTBSC (FIG. 7) | $QP_1 \& QP_2, QP_4, \ldots QP_{n-1} \& QN_3, QN_5, \ldots QN_n$ | $QP_3, QP_5, \ldots QP_n \& QN_2, QN_4, \ldots QN_{n-1}$ | $QN_1 \& QP_3, QP_5, \ldots QP_n \& QN_2, QN_4, \ldots QN_{n-1}$ | $QN_1 \& QP_2, QP_4, \ldots QP_{n-1} \& QN_3, QN_5, \ldots QN_n$ | Idle |
| Series-parallel RSCC (FIG. 9) | $Q_2, Q_3, \& Q_6, Q_9, \ldots Q_{3n-3}$ | $Q_2, Q_4, \& Q_5, Q_9, \ldots Q_{3n-3}$ | $Q_1, Q_4, \& Q_5, Q_8, \ldots Q_{3n-4} \& Q_7, Q_{10}, \ldots Q_{3n-2}$ | $Q_1, Q_3, \& Q_5, Q_8, \ldots Q_{3n-4} \& Q_7, Q_{10}, \ldots Q_{3n-2}$ | Idle |
| Fibonacci RSCC (FIG. 10) | $QA_1, QA_3, QA_5, \ldots \& QA_n \& QB_1, QB_3, QB_5, \ldots \& QC_2, QC_4, QC_6, \ldots$ | $QA_2, QA_4, QA_6, \ldots \& QB_1, QB_3, QB_5, \ldots \& QC_2, QC_4, QC_6, \ldots$ | $QA_2, QA_4, QA_6, \ldots \& QA_n \& QB_2, QB_4, QB_6, \ldots \& QC_1, QC_3, QC_5, \ldots$ | $QA_1, QA_3, QA_5, \ldots \& QB_2, QB_4, QB_6, \ldots \& QC_1, QC_3, QC_5, \ldots$ | Idle |

FIG. 11B

Table III

| Without idle state | | | | With idle state | | | |
|---|---|---|---|---|---|---|---|
| Method A | Method B | Method C | Method D | Method E | Method F | Method G |
| 2 | 2 | 2 | 2 | 2 | 2 | 2 |
| 1 | (1) | 1 | [5] | 1 | 4 | 1 |
| 4 | 4 | 4 | 4 | [5] | 3 | [5] |
| (3) | 3 | [5] | 3 | 4 | [5] | 4 |
|  |  |  |  |  |  | 3 |
|  |  |  |  |  |  | [5] |

The symbol [5] represents that the duration of idle state 5 can be adjusted to vary the switching frequency.
The symbols (1) or (3) represent that the freewheeling state 1 or freewheeling state 3 is eliminated or minimized.

FIG. 11C

Table IV

| Without idle state | | With idle state | | | | |
| --- | --- | --- | --- | --- | --- | --- |
| Method H | Method I | Method J | Method K | Method L | Method M | Method N |
| 4 | 4 | 4 | 4 | 4 | 4 | 4 |
| 1 | (1) | 1 | [5] | 1 | 2 | 1 |
| 2 | 2 | 2 | 2 | [5] | 3 | [5] |
| (3) | 3 | [5] | 3 | 2 | [5] | 2 |
| | | | | | | 3 |
| | | | | | | [5] |

The symbol [5] represents that the duration of idle state 5 can be adjusted to vary the switching frequency.
The symbols (1) or (3) represent that the freewheeling state 1 or freewheeling state 3 is eliminated or minimized.

FIG. 11D

SWITCHING METHODS FOR REGULATING RESONANT SWITCHED-CAPACITOR CONVERTERS

CROSS REFERENCE TO RELATED APPLICATIONS

This application is the 35 U.S.C. § 371 national stage application of PCT Application No. PCT/US2020/062874, filed Dec. 2, 2020, which claims priority to, and the benefit of, U.S. provisional application entitled "Switching Methods for Regulating Resonant Switched-Capacitor Converters" having Ser. No. 62/942,651, filed Dec. 2, 2019, both of which are hereby incorporated by reference herein in their entireties.

BACKGROUND

Switched-capacitor converters (SCCs) are recognized for their small size, light weight, high efficiency and high-power density compared to inductor-based converters. However, SCCs typically suffer from dramatic transient current spikes, narrow voltage regulation range, and low efficiency when voltage regulation is required. By adding one or multiple small inductors to the SCCs, resonant operation is enabled. The resulting converters, known as "resonant switched-capacitor converters" (RSCCs) overcome capacitor charge sharing losses and transient current spikes and provide zero current switching (ZCS) operation of switches and diodes. The previously reported RSCCs and switching control sequences have not reached the point of full range voltage gain adjustment (often referred as voltage regulation). The invention is related to new switching control sequences enabling all existing or new RSCCs to perform full range voltage regulation.

SUMMARY

Aspects of the present disclosure are related to switching methods for adjusting the voltage gain of resonant switched-capacitor converters (RSCCs) to facilitate voltage regulation. In one aspect, among others, a method comprises operating switches of the RSCC in a repeated asymmetric sequence of switching states per switching cycle, the repeated asymmetric sequence of switching states comprising at least three switching states selected from a group consisting of five defined switching states, the five defined switching states including an idle state. The repeated asymmetric sequence of switching states can consist of four switching states selected from the group consisting of the five defined switching states. The five switching states can include four conducting states and the idle state.

In one or more aspects, the RSCC can be a basic RSCC comprising switches $Q_1$, $Q_2$, $Q_3$ and $Q_4$ or an inverse polarity RSCC comprising switches $Q_1$, $Q_2$, $Q_3$ and $Q_4$, and for step-down conversion the repeated asymmetric sequence of switching states can comprise states 2, 1 and 4 or states 2, 4 and 3, where switches $Q_2$ and $Q_3$ are ON in State 1, switches $Q_2$ and $Q_4$ are ON in State 2, switches $Q_1$ and $Q_4$ are ON in State 3, and switches $Q_1$ and $Q_3$ are ON in State 4. The RSCC can be an n-stage Dickson RSCC comprising switches $Q_i$ where i=1, 2, 3, ..., 2n with n>1, and for step-down conversion the repeated asymmetric sequence of switching states can comprise states 2, 1 and 4 or states 2, 4 and 3, where switches $Q_2$ and $Q_3$, ..., $Q_{2n-1}$ are ON in State 1, switches $Q_2$, ..., $Q_{2n}$ are ON in State 2, switches $Q_1$ and $Q_4$, ..., $Q_{2n}$ are ON in State 3, and switches $Q_1$, ..., $Q_{2n-1}$ are ON in State 4.

In some aspects, the RSCC can be an n-stage series-parallel RSCC comprising switches $Q_i$ where i=1, 2, 3, ..., 3n−2 with n>2, and for step-down conversion the repeated asymmetric sequence of switching states can comprise states 2, 1 and 4 or states 2, 4 and 3, where switches $Q_2$ and $Q_3$, ..., $Q_{3n-n}$ are ON in State 1, switches $Q_2$, $Q_4$ and $Q_6$, ..., $Q_{3n-n}$ are ON in State 2, switches $Q_1$, $Q_4$ and $Q_5$, ..., $Q_{3N-4}$ are ON in State 3, and switches $Q_1$, $Q_3$, $Q_5$, ..., $Q_{3n-4}$ and $Q_7$, ..., $Q_{3n-2}$ are ON in State 4. The RSCC can be an n-stage Fibonacci RSCC comprising switches $QA_i$, $QB_j$ and $QC_j$ where i=1, 2, 3, ..., n and j=1, 2, ..., n−1 with n>3, and for step-down conversion the repeated asymmetric sequence of switching states can comprise states 2, 1 and 4 or states 2, 4 and 3, where switches $QA_1$, $QA_3$, ..., $QB_1$, $QB_3$, ..., and $QC_2$, $QC_4$, ... are ON in State 1, switches $QA_2$, $QA_4$, ..., $QB_1$, $QB_3$, ..., and $QC_2$, $QC_4$, ... are ON in State 2, switches $QA_2$, $QA_3$, $QA_4$, ..., $QB_2$, $QB_4$, ..., and $QC_1$, $QC_3$, ... are ON in State 3, and switches $QA_1$, $QA_3$, ..., $QB_2$, $QB_4$, ..., and $QC_1$, $QC_3$, ... are ON in State 4. The repeated asymmetric sequence of switching states can consist of states 2, 1, 4 and 3, or states 2, 1, 4 and 5, or states 2, 5, 4 and 3, or states 2, 1, 5 and 4, or states 2, 4, 3 and 5, where state 5 is the idle state.

In various aspects, the RSCC can be a basic RSCC comprising switches $Q_1$, $Q_2$, $Q_3$ and $Q_4$, and for step-up conversion the repeated asymmetric sequence of switching states can comprise states 4, 1 and 2 or states 4, 2 and 3, where switches $Q_2$ and $Q_3$ are ON in State 1, switches $Q_2$ and $Q_4$ are ON in State 2, switches $Q_1$ and $Q_4$ are ON in State 3, and switches $Q_1$ and $Q_3$ are ON in State 4. The RSCC can be an n-stage ladder RSCC comprising switches $Q_i$ where i=1, 2, 3, ..., 2n with n>1 or an n-stage Dickson RSCC comprising switches $Q_i$ where i=1, 2, 3, ..., 2n with n>1, and for step-up conversion the repeated asymmetric sequence of switching states can comprise 4, 1 and 2 or states 4, 2 and 3, where switches $Q_2$ and $Q_3$, ..., $Q_{2n-1}$ are ON in State 1, switches $Q_2$, ..., $Q_{2n}$ are ON in State 2, switches $Q_1$ and $Q_4$, ..., $Q_{2n}$ are ON in State 3, and switches $Q_1$, ..., $Q_{2n}$ are ON in State 4. The RSCC can be an n-stage resonant two-switch boosting switched-capacitor converter (RTBSC) comprising switches $QP_i$ and $QN_i$ where i=1, 2, 3, ..., n with n=3, 5, 7, ..., and for step-up conversion the repeated asymmetric sequence of switching states can comprise 4, 1 and 2 or states 4, 2 and 3, where switches $QP_1$, and $QP_2$, $QP_4$, ... and $QN_3$, $QN_5$, ... are ON in State 1, switches $QP_1$, $QP_3$, ... and $QN_2$, $QN_4$, ... are ON in State 2, switches $QP_3$, $QP_5$, ... and $QN_1$ and $QN_2$, $QN_4$, ... are ON in State 3, and switches $QP_2$, $QP_4$, ... and $QN_1$ and $QN_3$, $QN_5$, ... are ON in State 4.

In some aspects, the RSCC can be an n-stage series-parallel RSCC comprising switches $Q_i$ where i=1, 2, 3, ..., 3n−2 with n>2, and for step-up conversion the repeated asymmetric sequence of switching states can comprise 4, 1 and 2 or states 4, 2 and 3, where switches $Q_2$ and $Q_3$, ..., $Q_{3n-n}$ are ON in State 1, switches $Q_6$, ..., $Q_{3n-n}$ are ON in State 2, switches $Q_1$, $Q_4$ and $Q_5$, ..., $Q_{3N-4}$ are ON in State 3, and switches $Q_1$, $Q_3$, $Q_5$, ..., $Q_{3n-4}$ and $Q_7$, ..., $Q_{3n-2}$ are ON in State 4. The RSCC can be an n-stage Fibonacci RSCC comprising switches $QA_i$, $QB_j$ and $QC_j$ where i=1, 2, 3, ..., n and j=1, 2, ..., n−1 with n>3, and for step-up conversion the repeated asymmetric sequence of switching states can comprise 4, 1 and 2 or states 4, 2 and 3, where switches $QA_1$, $QA_3$, ..., $QB_1$, $QB_3$, ..., and $QC_2$, $QC_4$, ... are ON in State 1, switches $QA_2$, $QA_4$, ..., $QB_1$, $QB_3$, ..., and $QC_2$, $QC_4$, ... are ON in State 2, switches $QA_2$, $QA_3$, $QA_4$, ..., $QB_2$, $QB_4$, ..., and $QC_1$, $QC_3$, ... are ON in State 3, and switches $QA_1$, $QA_3$, ..., $QB_2$, $QB_4$, ..., and $QC_1$, $QC_3$, ... are ON in State 4. The repeated asymmetric sequence of switching states consists of states 4, 1, 2 and 3, or states 4, 1, 2 and 5, or states 4, 5, 2 and 3, or states 4, 1, 5 and 2, or states 4, 2, 3 and 5, where state 5 is the idle state.

In another aspect, a method comprises operating switches of the RSCC in a repeated sequence of switching states per switching cycle, the repeated sequence of switching states comprising six switching states selected from a group consisting of five defined switching states, where at least one of the five defined switching states occurs twice in the six switching states and the five defined switching states includes an idle state. The repeated sequence of switching states can consist of each of the five defined switching states with the idle state occurring twice. The five switching states can include four conducting states and the idle state.

In one or more aspects, the RSCC can be a basic RSCC comprising switches $Q_1$, $Q_2$, $Q_3$ and $Q_4$ or an inverse polarity RSCC comprising switches $Q_1$, $Q_2$, $Q_3$ and $Q_4$, and for step-down conversion the repeated sequence of switching states can comprise states 2, 1, 5, 4, 3 and 5, where switches $Q_2$ and $Q_3$ are ON in State 1, switches $Q_2$ and $Q_4$ are ON in State 2, switches $Q_1$ and $Q_4$ are ON in State 3, switches $Q_1$ and $Q_3$ are ON in State 4, and the switches are idle in State 5. The RSCC can be an n-stage Dickson RSCC comprising switches $Q_i$ where i=1, 2, 3, ..., 2n with n>1, and step-down conversion the repeated sequence of switching states can comprise states 2, 1, 5, 4, 3 and 5, where switches $Q_2$ and $Q_3$, ..., $Q_{2n-1}$ are ON in State 1, switches $Q_2$, ..., $Q_{2n}$ are ON in State 2, switches Q1 and $Q_4$, ..., $Q_{2n}$ are ON in State 3, and switches $Q_1$, ..., $Q_{2n-1}$ are ON in State 4, and the switches are idle in State 5. The RSCC can be an n-stage series-parallel RSCC comprising switches $Q_i$ where i=1, 2, 3, ..., 3n−2 with n>2, and for step-down conversion the repeated sequence of switching states can comprise states 2, 1, 5, 4, 3 and 5, where switches $Q_2$ and $Q_3$, ..., $Q_{3n-3}$ are ON in State 1, switches $Q_2$, $Q_4$ and $Q_6$, ..., $Q_{3n-n}$ are ON in State 2, switches $Q_1$, $Q_4$ and $Q_5$, ..., $Q_{3N-4}$ are ON in State 3, and switches $Q_1$, $Q_3$, $Q_5$, ..., $Q_{3n-4}$ and $Q_7$, ..., $Q_{3n-2}$ are ON in State 4, and the switches are idle in State 5.

In some aspects, the RSCC can be an n-stage Fibonacci RSCC comprising switches $QA_i$, $QB_j$ and $QC_j$ where i=1, 2, 3, ..., n and j=1, 2, ..., n−1 with n>3, and for step-down conversion the repeated sequence of switching states can comprise states 2, 1, 5, 4, 3 and 5, where switches $QA_1$, $QB_1$, $QB_3$, ..., and $QC_2$, $QC_4$, ... are ON in State 1, switches $QA_2$, $QB_1$, $QB_3$, ..., and $QC_2$, $QC_4$, ... are ON in State 2, switches $QA_2$, $QA_3$, $QA_4$, ..., $QB_2$, $QB_4$, ..., and $QC_1$, $QC_3$, ... are ON in State 3, and switches $QA_1$, $QA_3$, ..., $QB_2$, $QB_4$, ..., and $QC_1$, $QC_3$, ... are ON in State 4, and the switches are idle in State 5. The RSCC can be a basic RSCC comprising switches $Q_1$, $Q_2$, $Q_3$ and $Q_4$, and for step-up conversion the repeated sequence of switching states can comprise states 4, 1, 5, 2, 3 and 5, where switches $Q_2$ and $Q_3$ are ON in State 1, switches $Q_2$ and $Q_4$ are ON in State 2, switches $Q_1$ and $Q_4$ are ON in State 3, and switches $Q_1$ and $Q_3$ are ON in State 4, and the switches are idle in State 5.

In various aspects, the RSCC can be an n-stage ladder RSCC comprising switches $Q_i$ where i=1, 2, 3, ..., 2n with n>1 or an n-stage Dickson RSCC comprising switches $Q_i$ where i=1, 2, 3, ..., 2n with n>1, and for step-up conversion the repeated sequence of switching states can comprise states 4, 1, 5, 2, 3 and 5, where switches $Q_2$ and $Q_3$, ..., $Q_{2n-1}$ are ON in State 1, switches $Q_2$, ..., $Q_{2n}$ are ON in State 2, switches $Q_1$ and $Q_4$, ..., $Q_{2n}$ are ON in State 3, and switches $Q_1$, ..., $Q_{2n-1}$ are ON in State 4, and the switches are idle in State 5. The RSCC can be an n-stage resonant two-switch boosting switched-capacitor converter (RTBSC) comprising switches $QP_i$ and $QN_i$ where i=1, 2, 3, ..., n with n=3, 5, 7, ..., and for step-up conversion the repeated sequence of switching states can comprise states 4, 1, 5, 2, 3 and 5, where switches $QP_1$, and $QP_2$, $QP_4$, ... and $QN_3$, $QN_5$, ... are ON in State 1, switches $QP_1$, $QP_3$, ... and $QN_2$, $QN_4$, ... are ON in State 2, switches $QP_3$, $QP_5$, ... and $QN_1$ and $QN_2$, $QN_4$, ... are ON in State 3, and switches $QP_2$, $QP_4$, ... and $QN_1$ and $QN_3$, $QN_5$, ... are ON in State 4, and the switches are idle in State 5.

In some aspects, the RSCC is an n-stage series-parallel RSCC comprising switches $Q_i$ where i=1, 2, 3, ..., 3n−2 with n>2, and for step-up conversion the repeated sequence of switching states comprises states 4, 1, 5, 2, 3 and 5, where switches $Q_2$ and $Q_3$, ..., $Q_{3n-3}$ are ON in State 1, switches $Q_2$, $Q_4$ and $Q_6$, ..., $Q_{3n-n}$ are ON in State 2, switches $Q_1$, $Q_4$ and $Q_5$, ..., $Q_{3N-4}$ are ON in State 3, and switches $Q_1$, $Q_3$, $Q_5$, ..., $Q_{3n-4}$ and $Q_7$, ..., $Q_{3n-2}$ are ON in State 4, and the switches are idle in State 5. The RSCC can be an n-stage Fibonacci RSCC comprising switches $QA_i$, $QB_j$ and $QC_j$ where i=1, 2, 3, ..., n and j=1, 2, ..., n−1 with n>3, and for step-up conversion the repeated sequence of switching states can comprise states 4, 1, 5, 2, 3 and 5, where switches $QA_1$, $QA_3$, ..., $QB_1$, $QB_3$, ..., and $QC_2$, $QC_4$, ... are ON in State 1, switches $QA_2$, $QA_4$, ..., $QB_1$, $QB_3$, ..., and $QC_2$, $QC_4$, ... are ON in State 2, switches $QA_2$, $QA_3$, $QA_4$, ..., $QB_2$, $QB_4$, ..., and $QC_1$, $QC_3$, ... are ON in State 3, and switches $QA_1$, $QA_3$, ..., $QB_2$, $QB_4$, ..., and $QC_1$, $QC_3$, ... are ON in State 4, and the switches are idle in State 5.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 11A shows a table illustrating the function of the Fibonacci sequence, in accordance with various embodiments of the present disclosure.

FIG. 11B shows a table illustrating operation states for the RSCC circuits in FIGS. 4-10, in accordance with various embodiments of the present disclosure.

FIGS. 11C and 11D show tables illustrating switching sequences to achieve full-range regulation for the RSCC circuits in FIGS. 4-10, in accordance with various embodiments of the present disclosure. FIG. 11C illustrates switching sequences that can achieve full-range regulation for the RSCC circuits shown in FIGS. 4, 5 and 8-10 for step-down conversion. FIG. 11D illustrates switching sequences that can achieve full-range regulation for the RSCC circuits shown in FIGS. 4 and 6-10 for step-up conversion. FIG. 11D also illustrates switching sequences that can achieve full-range regulation for the RSCC circuits shown in FIG. 5 for inverse polarity step-down conversion.

DETAILED DESCRIPTION

Figure 1:
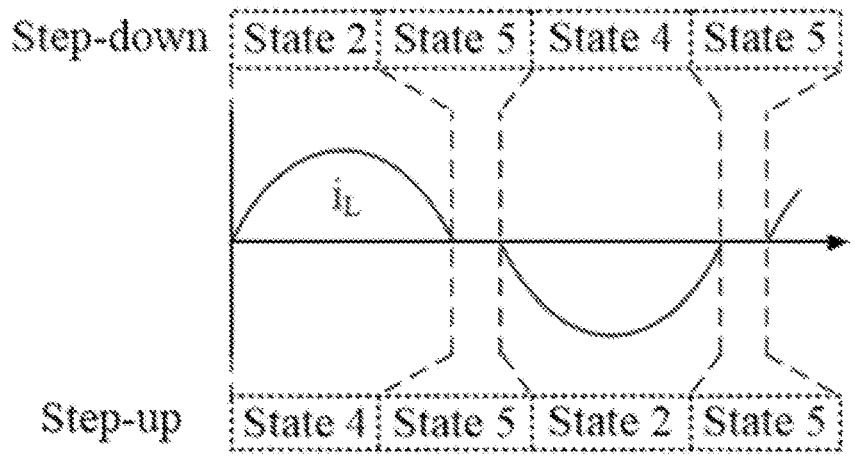
FIGS. 1 and 2 are examples of timing diagrams of resonant switched-capacitor converter (RSCC) switching methods.

Disclosed herein are various embodiments of methods related to switching methods for regulating resonant switched-capacitor converters (RSCCs). RSCCs have improved voltage regulation capability compared to SCCs. However, full-range voltage regulation for all load levels has been difficult to achieve. Reference will now be made in detail to the description of the embodiments as illustrated in the drawings, wherein like reference numbers indicate like parts throughout the several views.

Figure 2:
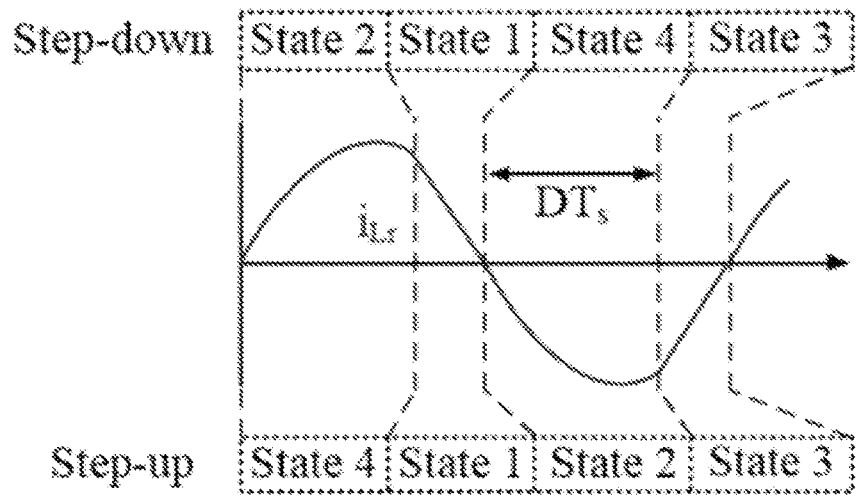
Figure 3A:
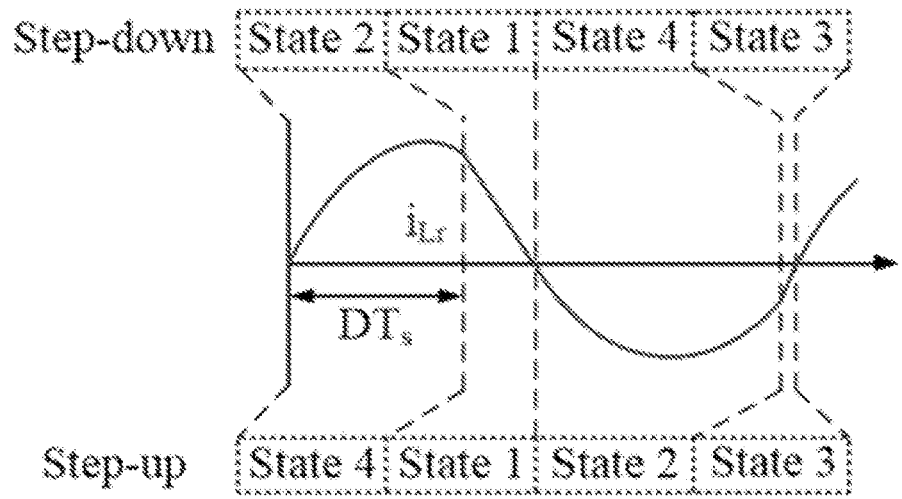
FIGS. 3A-3G are examples of timing diagrams for proposed RSCC switching methods, in accordance with various embodiments of the present disclosure.
Figure 3B:
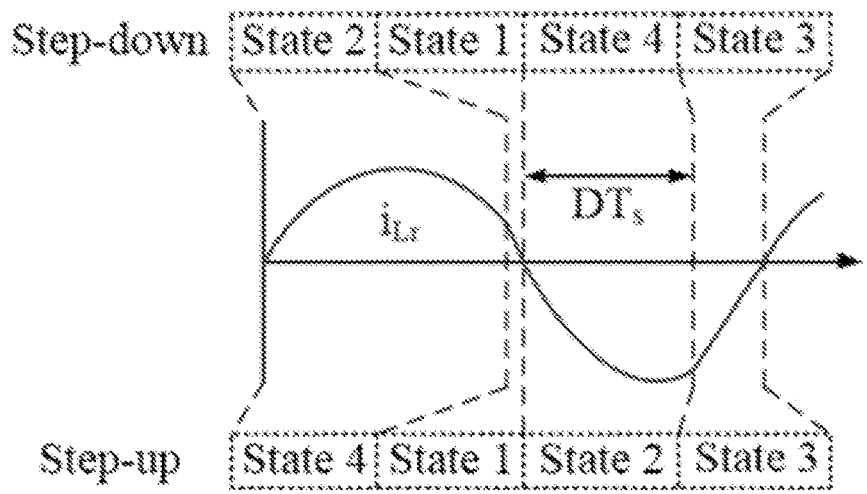
Figure 3C:
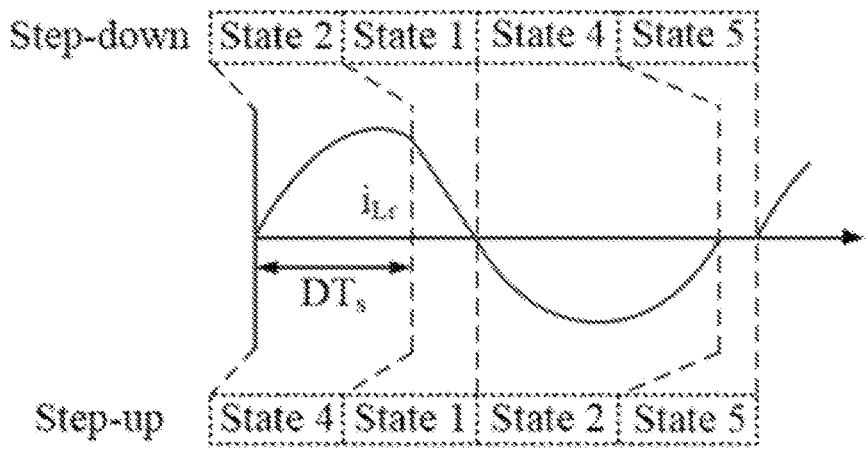
Figure 3D:
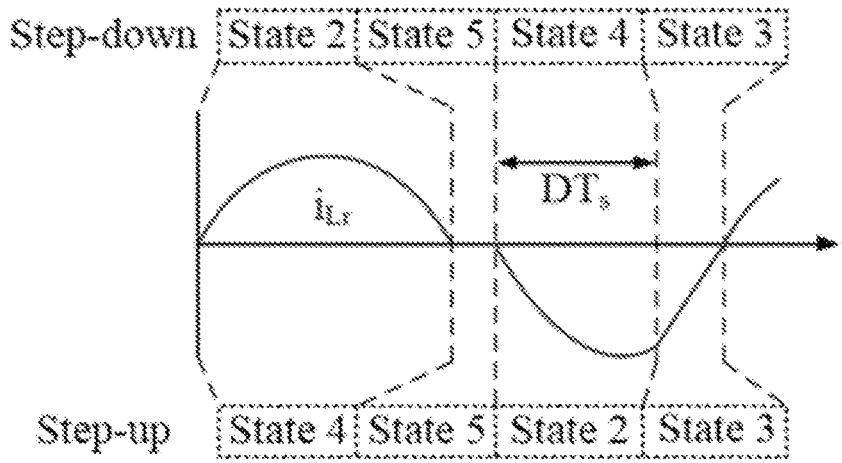
Figure 3E:
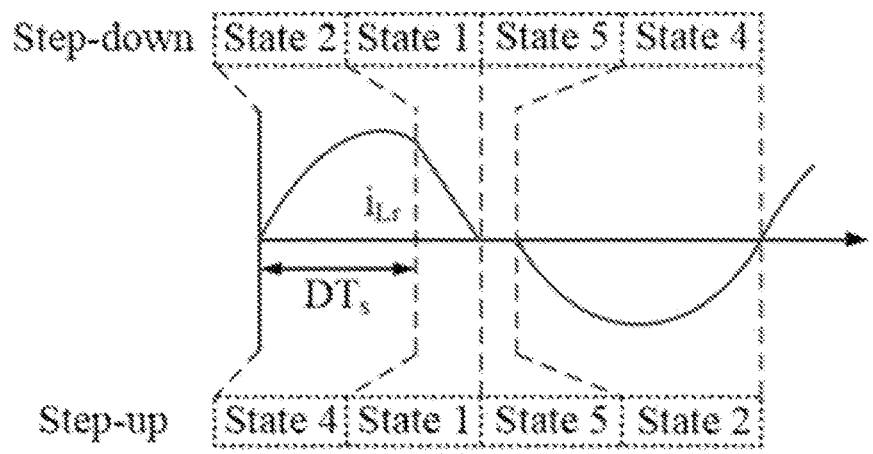
Figure 3F:
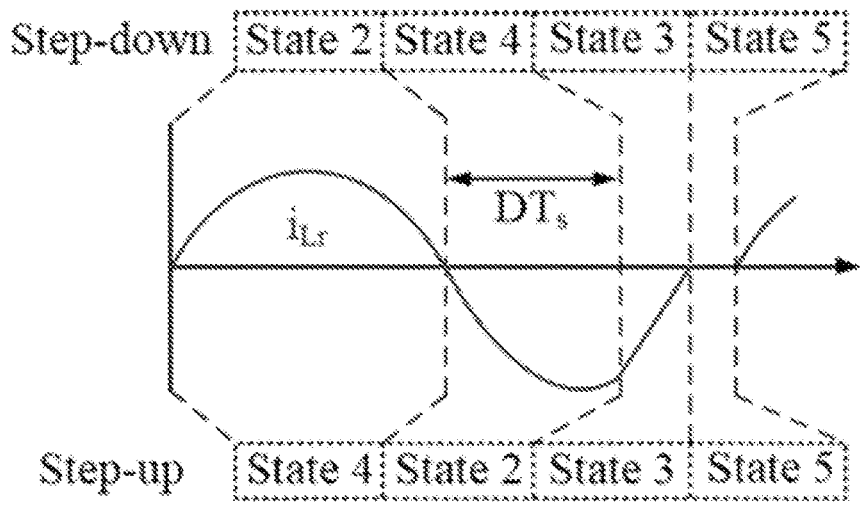
Figure 3G:
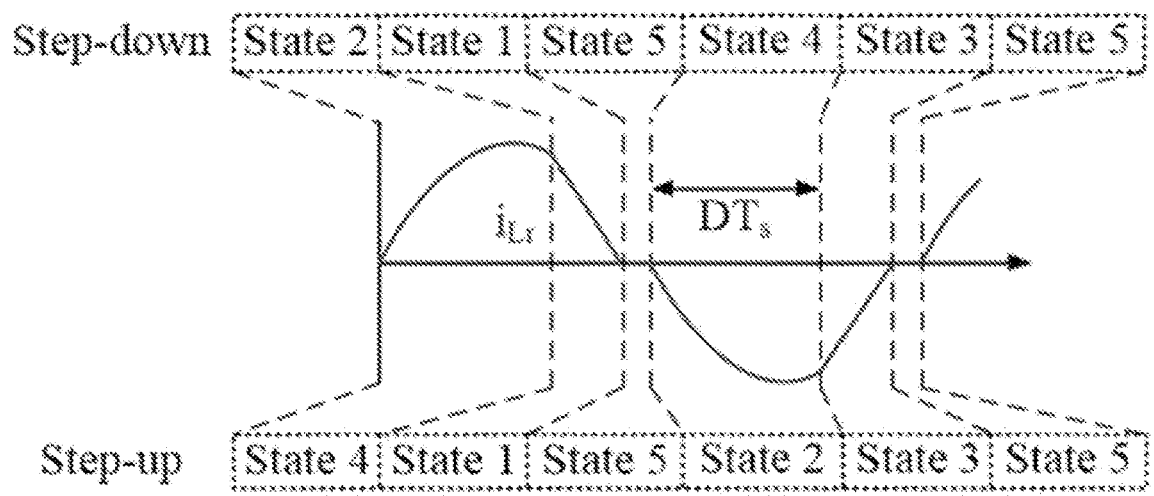

FIGS. 1 and 2 show examples of timing diagrams for RSCC switching methods. Under the switching method illustrated in FIG. 1, the waveform of the inductor current is half of the sinusoid during states 2 and 4 respectively, while the duration of idle state 5 is adjusted to regulate the voltage. Under the switching method illustrated in FIG. 2, the waveform of the inductor current consists of four symmetric partial sinusoidal waveforms in operation states 1-4 without any idle state.

In FIG. 2, when RSCCs operate in step-down voltage conversion, the switching sequence in each switching cycle is in a pattern of states 2, 1, 4 and 3. When RSCCs operate in step-up voltage conversion, the switching sequence in each switching cycle is in a pattern of states 4, 1, 2 and 3. The duration of each switching cycle can be denoted as $T_s$, which could be constant or variable. The duration of state 1 is equal to the duration of state 3. The duration of state 2 is equal to the duration of state 4. The duty cycle D is defined as the duration of the on-states (state 2 or state 4) divided by the duration of switching cycle. The current flow through the transistors is inverted during freewheeling state 1 and state 3. However, while RSCCs have improved voltage regulation capability compared to SCCs, full-range voltage regulation for all load levels has not been possible.

In the present disclosure, a general solution is provided for all RSCCs to achieve full-range voltage regulation for RSCCs with one or more resonant inductors. This can be achieved by controlling the switching sequence (or timing diagram) of the converters. Furthermore, this general solution can bring soft switching to all switching devices as an added benefit. Although, the disclosed switching method is applicable to a large number of converters, this disclosure will present examples that cover a subset of RSCCs that have the greatest potential for engineering applications.

The disclosed switching scheme is presented with respect to 14 switching methods (A-N) that use the combination of the states shown in FIGS. 3A-3G. For example, switching methods G and N will use all the states shown in FIG. 3G, while the others A and H (FIG. 3A), B and I (FIG. 3B), C and J (FIG. 3C), D and K (FIG. 3D), E and L (FIG. 3E), and F and M (FIG. 3F) will use a combination of part of the states. Therefore, the inductor current waveform can be half of the sinusoid or a part of the sinusoid during on-state 2 as well as on-state 4, while the freewheeling states 1 and 3 can be eliminated or minimized. Furthermore, the idle state 5 can also be eliminated. In some embodiments, the combination of states is arranged asymmetrically with respect to durations within one repetitive cycle, while others are symmetrical. The repetitive cycle can be variable or constant.

In FIGS. 3A-3G, since the duration of state 2 and state 4 may not be equal for the 14 switching methods, the duty cycle D can be defined as the lesser of the two on-states (state 2 or state 4) divide by the duration of the switching cycle. The duration of each switching cycle can be denoted as $T_S$.

Examples of RSCCs that can be controlled using these switching methods include, but are not limited to, the basic RSCC, inverse polarity RSCC, ladder RSCC, resonant two-switch boosting switched-capacitor converter (RTBSC), Dickson RSCC, series-parallel RSCC and Fibonacci RSCC. Fourteen switching sequences were applied to these circuits. Among these examples, the RSCCs without idle states are of particular interest due to their benefits of zero voltage switching (ZVS) turn-on of switches, ZCS turn-off of diodes, complementary driving signals without zero-current detection, simple half-bridge gate driver with bootstrap circuit, and soft switching commutation in spite of inductance and capacitance variations, in addition to full-range regulation.

FIGS. 4 and 6-10 show a set of RSCC examples, where the high dc voltage port is denoted as $V_{HV}$ and the low dc voltage port is denoted as $V_{LV}$. The filter capacitors are labeled as $C_{o1}$ and $C_{o2}$, which is connected across the two dc ports respectively. The value of these filter capacitors can be minimized or zero depending on the application. When any of the converters operates in step-down conversion, the voltage source is applied to the port denoted as $V_{HV}$ and the load is applied to the port denoted as $V_{LV}$. When any of the converters operates in step-up conversion, the voltage source is applied to the port denoted as $V_{LV}$ while the load is applied to the port denoted as $V_{HV}$.

Figure 4:
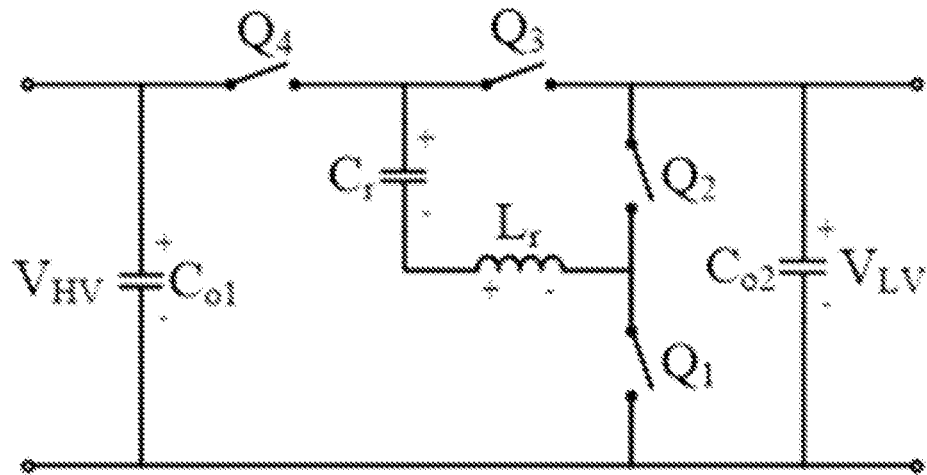
FIG. 4 is a schematic diagram illustrating an example of a basic RSCC, in accordance with various embodiments of the present disclosure.

The circuit shown in FIG. 4 is known as the basic RSCC. The switches $Q_1$, $Q_2$, $Q_3$ and $Q_4$ can be either transistors or diodes. The resonant capacitor $C_r$ and the resonant inductor $L_r$ are connected in series.

Figure 5:
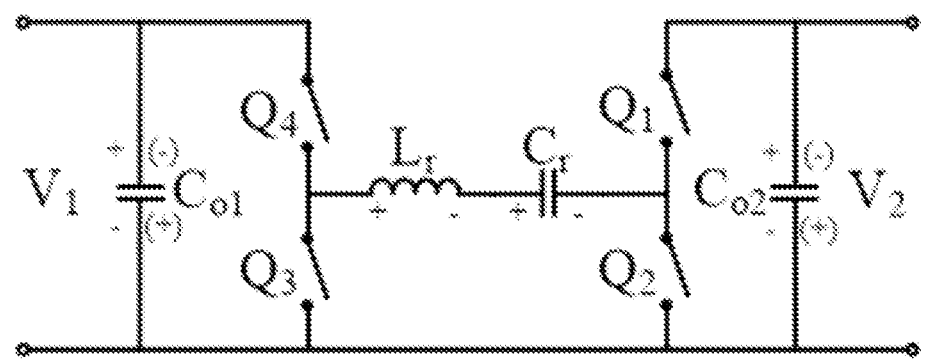
FIG. 5 is a schematic diagram illustrating an example of an inverse polarity RSCC, in accordance with various embodiments of the present disclosure.

FIG. 5 shows an example of the circuit of an inverse polarity RSCC. The switches $Q_1$, $Q_2$, $Q_3$ and $Q_4$ can be either transistors or diodes. The resonant capacitor $C_r$ and the resonant inductor $L_r$ is series connected. The dc voltage ports are denoted as $V_1$ and $V_2$. There are two types of ports polarity definition. The first type defines the common negative polarity of $V_1$ and $V_2$ while second type defines the common positive polarity of $V_1$ and $V_2$ by swapping the ports polarity.

Figure 6:
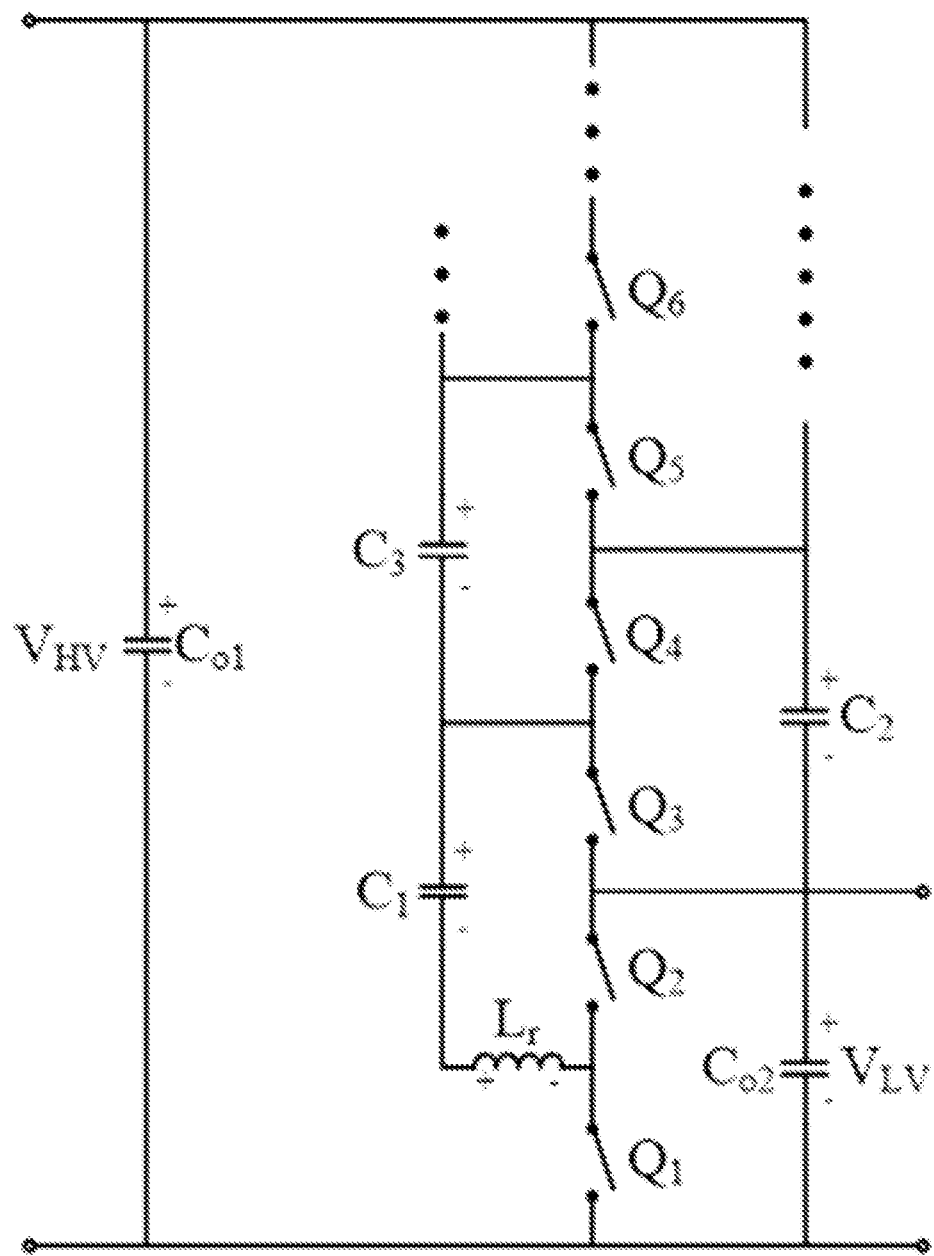
FIG. 6 is a schematic diagram illustrating an example of a ladder RSCC, in accordance with various embodiments of the present disclosure.

FIG. 6 shows an example of the circuit of a ladder RSCC. The switches $Q_i$ (i=1, 2, 3, . . . , 2n) can be transistors or diodes, while the capacitors are $C_i$ (i=1, 2, 3, . . . , 2n-2). The $C_1$ represents the resonant capacitor ($C_r = C_1$), while the $L_r$ represents the resonant inductor. There are n (n=1, 2, 3, 4 . . . ) stages in the ladder RSCC with one base stage and n-1 extension stages. The base stage comprises two switches $Q_1$, $Q_2$ and one inductor $L_r$, while each extension stage comprises two switches and two capacitors. There are overall 2n switches and 2n-2 capacitors, while the capacitor $C_{2n-2}$ in the last stage can be eliminated due to the clamped dc voltage $V_{HV}$.

Figure 7:
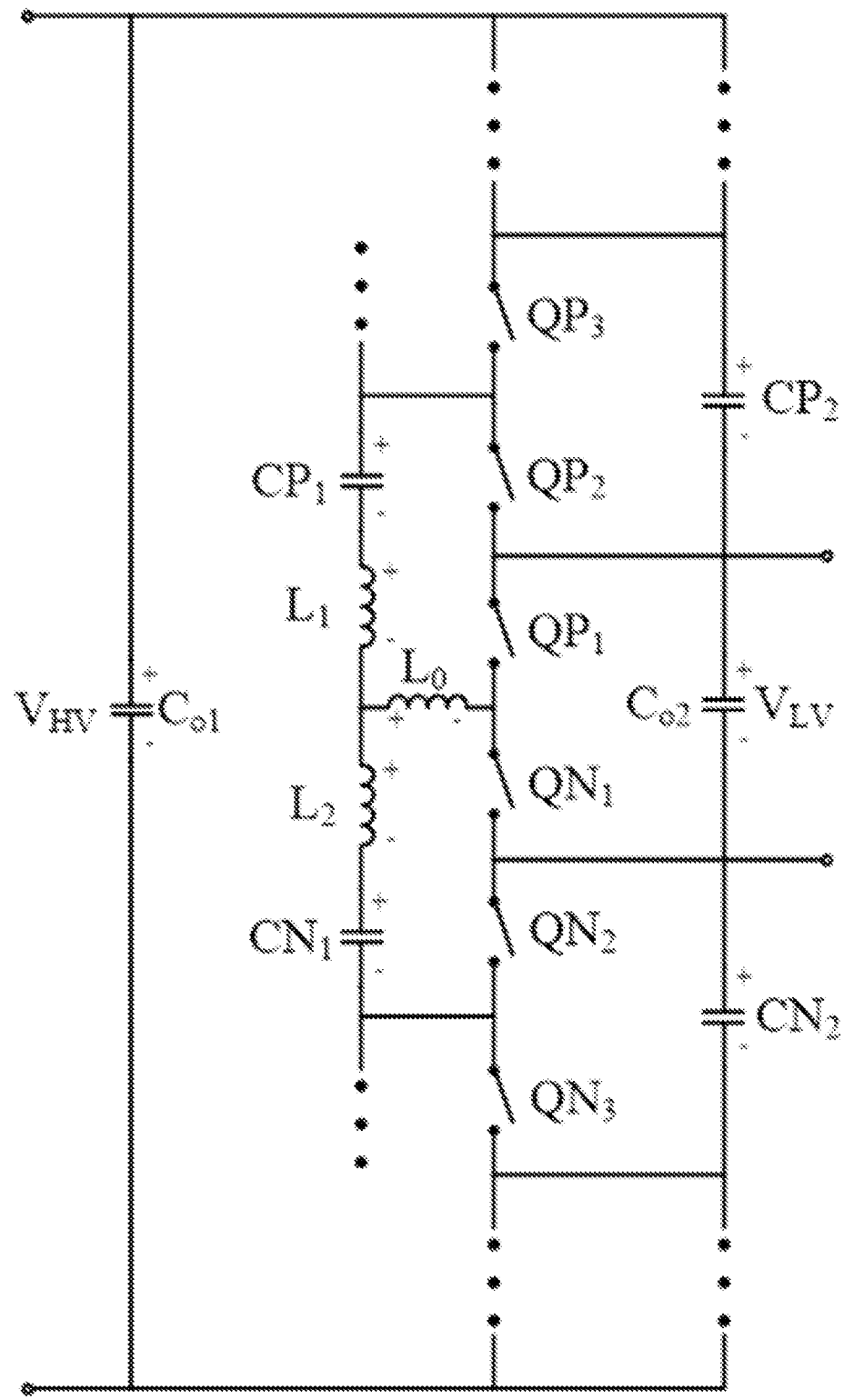
FIG. 7 is a schematic diagram illustrating an example of a resonant two-switch boosting switched-capacitor converter (RTBSC), in accordance with various embodiments of the present disclosure.

FIG. 7 shows an example of the circuit of a resonant two-switch boosting switched-capacitor converter (RTBSC). The switches in the positive leg and negative leg are $QP_i$ and $QN_i$, correspondingly, (i=1, 2, 3, . . . , n). The switches $QP_i$ and $QN_i$ can be either transistors or diodes. The capacitors in the positive leg and negative leg are $CP_j$ and $CN_j$, respectively, (j=1, 2, 3, . . . , n-1). The combination of $CP_1$ and $CN_1$, forms resonant capacitors.

$$C_r = CP_1 + CN_1 \quad (1)$$

The resonant inductors in the RTBSC are $L_0$, $L_1$ and $L_2$. The resonant inductors $L_1$ is series connected to $CP_1$ and $L_2$ is series connected to $CN_1$, respectively. In most applications, $L_1$ and $L_2$ can be zero.

$$L_r = L_0 + \frac{L_1 L_2}{L_1 + L_2} \quad (2)$$

There are n (n=3, 5, 7, . . . ) stages in the RTBSC with one base stage and n-1 extension stages. The base stage comprises two switches $QP_1$, $QN_1$ and the inductors $L_0$, $L_1$ and $L_2$, while each extension stage comprises two switches and two capacitors. There are overall n switches $QP_i$ in the positive leg and n switches $QN_i$ in the negative leg. There are overall n-1 capacitors $CP_i$ in the positive leg and n-1 capacitors $CN_i$ in the negative leg.

Figure 8:
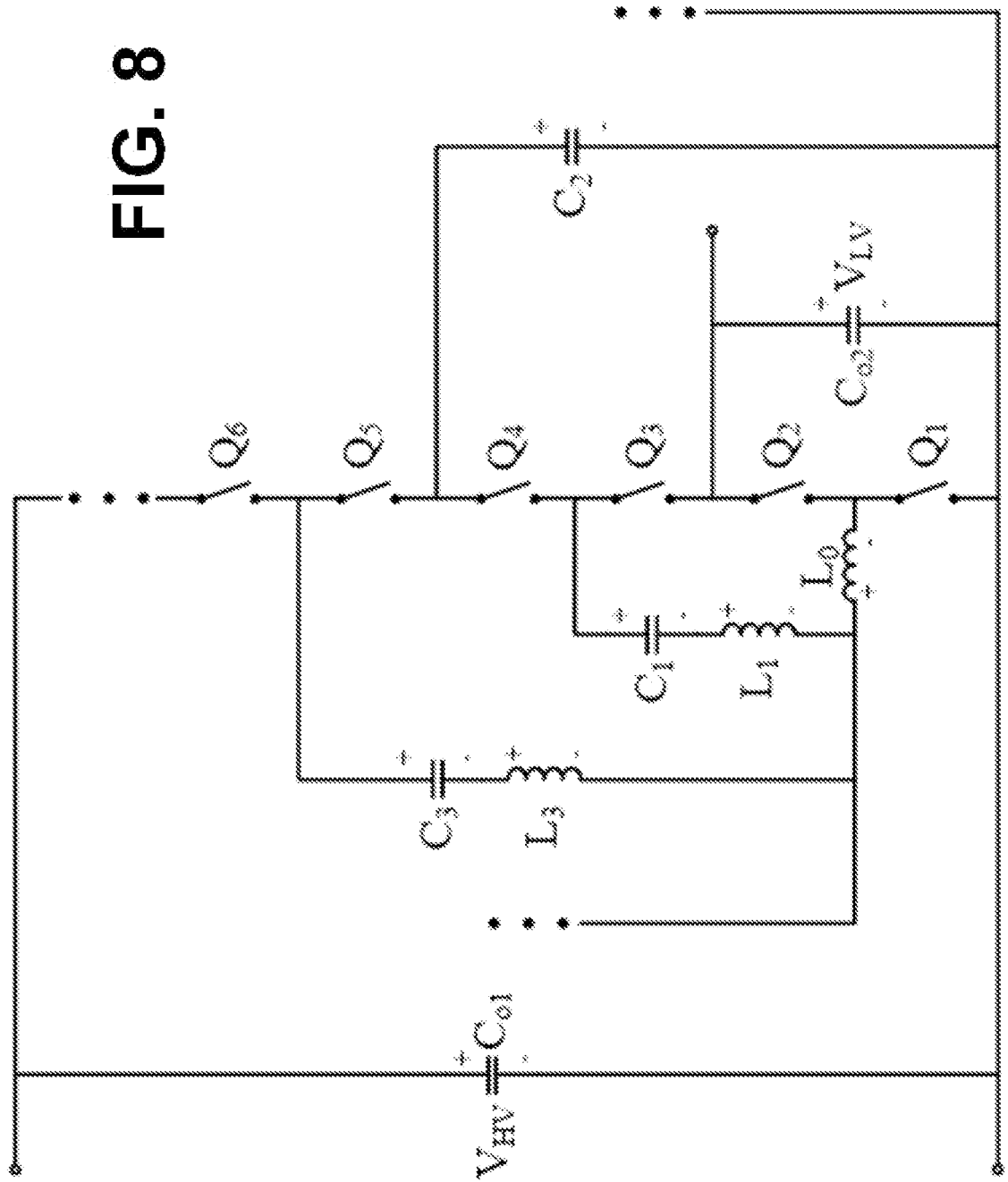
FIG. 8 is a schematic diagram illustrating an example of a Dickson RSCC, in accordance with various embodiments of the present disclosure.

FIG. 8 shows an example of the circuit of a Dickson RSCC. The switches $Q_1$ (i=1, 2, 3, . . . , 2n) can be either transistors or diodes. The capacitors are $C_i$ (i=1, 2, 3, . . . , 2n-2) and the inductors are $L_k$ (k=0, 1, 3, 5, . . . , 2n-3) represents capacitors and inductors respectively.

$$C_r = C_1 + C_3 + \ldots + C_{2n-2} \quad (3)$$

$$L_r = L_0 + \frac{1}{\frac{1}{L_1} + \frac{1}{L_3} + \ldots + \frac{1}{L_{2n-3}}} \quad (4)$$

The inductance of $L_0$ can be minimized or zero when all of the rest inductors have non-zero inductance. Vice versa, the inductance of $L_0$ is non-zero when all of the rest inductors have minimized or zero inductance. There are n (n=2, 3, 4, . . . ) stages in the Dickson RSCC with one base stage and n-1 extension stages. The base stage comprises two switches $Q_1$, $Q_2$ and one inductor $L_0$, while each extension stage comprises two switches, two capacitors and one inductor. There are overall 2n switches and 2n-2 capacitors, while the capacitor $C_{2n-2}$ in the last stage can be eliminated due to the clamped dc voltage $V_{HV}$.

Figure 9:
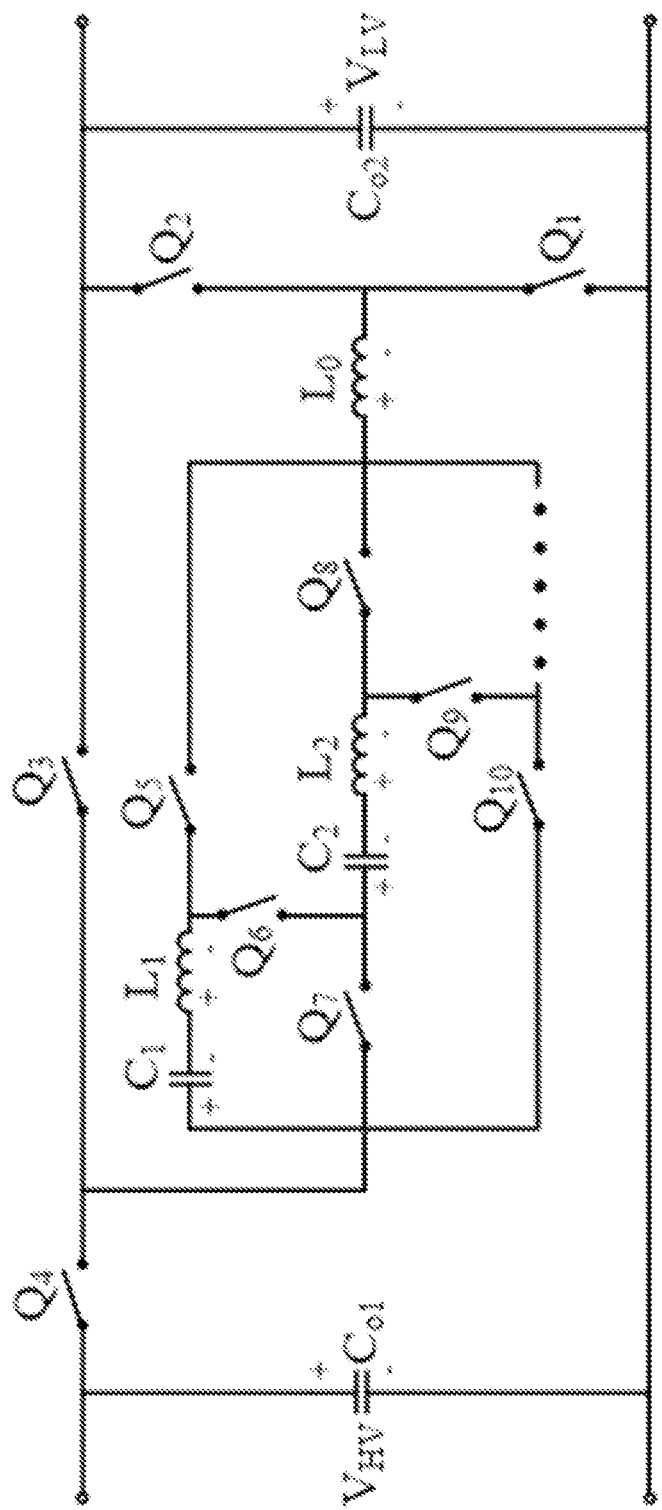
FIG. 9 is a schematic diagram illustrating an example of a series-parallel RSCC, in accordance with various embodiments of the present disclosure.

FIG. 9 shows an example of the circuit of a series-parallel RSCC. The switches $Q_i$ (i=1, 2, 3, . . . , 3n-2) can be either transistors or diodes, while $C_i$ and $L_i$ (i=1, 2, 3, . . . , n-1) represent capacitors and inductors respectively.

$$C_r = C_1 = C_2 = \ldots = C_{n-1} \quad (5)$$

$$L_r = L_1 = L_2 = \ldots = L_{n-1} \text{ when } L_0 = 0 \quad (6)$$

$$L_r = L_0 \text{ when } L_1 = L_2 = \ldots = L_{n-1} = 0 \quad (7)$$

The inductance of $L_0$ can be zero when all of the rest inductors have non-zero inductance. Vice versa, the inductance of $L_0$ is non-zero when all of the rest inductors have zero inductance. However, the resonant frequency in the charge process is different from the resonant frequency in the discharge process when the inductance of $L_0$ is non-zero. There are n (n=2, 3, 4, . . . ) stages in the series-parallel RSCC with one base stage and n-1 extension stages. The base stage comprises one inductor $L_0$ and one switch $Q_1$, while each extension stage comprises three switches, one capacitor and one inductor. There are overall 3n-2 switches and n-1 capacitors.

Figure 10:
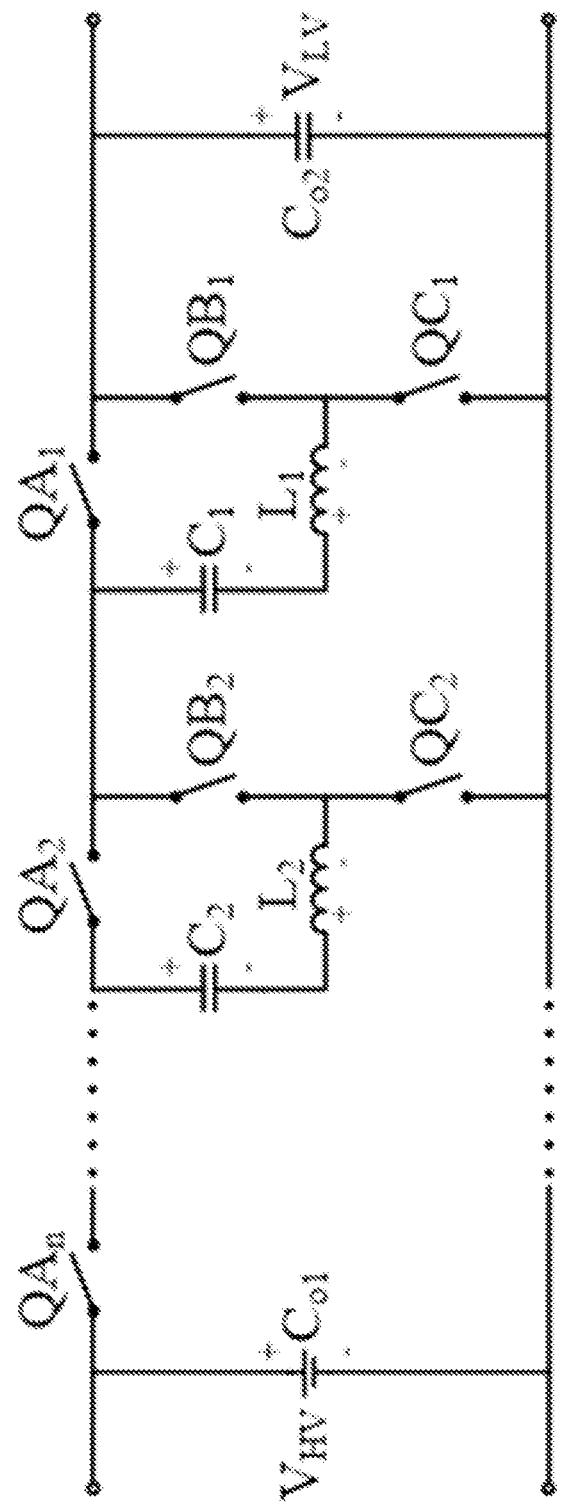
FIG. 10 is a schematic diagram illustrating an example of a Fibonacci RSCC, in accordance with various embodiments of the present disclosure.

FIG. 10 shows an example of the circuit of a Fibonacci RSCC. The switches $QA_i$ (i=1, 2, 3, . . . , n), $QB_j$, and $QC_j$ (j=1, 2, 3, . . . , n-1) can be transistors or diodes, while $C_j$ and $L_j$ represents capacitors and inductors respectively.

$$C_r = C_1 = C_2 = \ldots = C_{n-1} \quad (8)$$

$$L_r = L_1 = L_2 = \ldots = L_{n-1} \quad (9)$$

There are n (n=2, 3, 4, . . . ) stages in the Fibonacci RSCC. Each stage comprises three switches, one capacitor and one inductor, while the last stage has only one switch $QA_n$. There are overall 3n-2 switches and n-1 capacitors. The function of Fibonacci sequence is tabulated in table in FIG. 11A.

In FIGS. 6 and 8-10, all the circuits can be simplified into the basic RSCC as shown in FIG. 4 when n=2. In FIGS. 4-10, the capacitors C and inductors L that series connected are resonant capacitors and resonant inductors. The table of FIG. 11A shows the function of the Fibonacci sequence. The operation states for all the above mentioned RSCC circuits (FIGS. 4-10) is defined in the table of FIG. 11B. The conducting switches are shown in the table for each of the operation states of the corresponding RSCC circuit. The other switches not given in the table of FIG. 11B are non-conducting. The switches can be either transistors or diodes. When the switch Q is a transistor in the RSCC circuits, both positive and negative current flowing through the transistor can be regarded as conducting as shown in the table of FIG. 11B.

In FIG. 11C, the table shows the switching sequences for the RSCC circuits shown in FIGS. 4, 5 and 8-10 (to achieve full-range regulation) using the proposed switching methods A, B, C, D, E, F and G for step-down conversion. Methods A and B do not use the idle state, while methods C, D, E, F and G allow the idle state 5 with adjustable durations. Following the switching sequences of the above seven switching methods, the RSCCs in FIGS. 4 and 8-10 can achieve full-range regulation for all loads when stepping-down the voltage from $V_{HV}$ to $V_{LV}$, while the RSCC in FIG. 5 can obtain inverse polarity step-down voltage conversion from $V_1$ to $V_2$. The switching frequency is variable for switching methods A and B, while the switching frequency may be fixed or variable for switching methods C, D, E, F and G depending on the duration of idle state 5.

The table of FIG. 11D shows the switching sequences for all the above mentioned RSCC circuits of FIGS. 4-10 (to achieve full-range regulation) using the proposed switching methods H, I, J, K, L, M and N. There is no idle state 5 in methods H and I, while the duration of idle state 5 is adjustable in methods J, K, L, M and N. Following the switching sequences of these seven switching methods, RSCCs in FIGS. 4 and 6-10 can achieve step-up voltage conversion from $V_{LV}$ to $V_{HV}$, while the RSCC in FIG. 5 can perform inverse polarity step-down voltage conversion from $V_2$ to $V_1$. The switching frequency is variable for switching methods H and I, while the switching frequency can be fixed or variable for switching methods J, K, L, M and N depending on the duration of the idle state 5.

In the tables of FIGS. 11C and 11D, the number 1, 2, 3, 4 and 5 represents the operation state 1, 2, 3, 4 and 5, respectively. Here, the symbols (1) or (3) represent that the freewheeling state 1 or freewheeling state 3 is eliminated or minimized. In addition, the symbol [5] represents that the duration of idle state 5 can be adjusted to vary the switching frequency. Moreover, one of the idle states may be eliminated for method G and N.

In order to display full-range regulation capability of RSCCs by proposed switching methods, the circuit parameters are defined as follows:

Frequency Ratio:

$$F = \frac{f_s}{f_r}, \text{ where } f_r = \frac{1}{2\pi\sqrt{L_r C_r}} \quad (10)$$

Characteristic impedance: $Z_r = \sqrt{L_r/C_r}$ (11)

Quality Factor:

$$Q = \frac{Z_r}{R_L} \quad (12)$$

Where $f_s$ and $f_r$ are switching frequency and resonant frequency. $L_r$ is the resonant inductance and $C_r$ is the resonant capacitance. and $R_L$ is the load resistance.

The inverse polarity step-down voltage conversion ratio $M_1$ for the RSCC in FIG. 5 is defined as:

$$M_1 = \frac{V_2}{V_1}, \text{ when } V_1 \text{ is input voltage, and} \quad (13)$$

-continued $$M_1 = \frac{V_1}{V_2}, \text{ when } V_2 \text{ is input voltage,} \quad (14)$$

where the range of $M_1$ is 0 to −1.

The step-down voltage conversion ratio $M_2$ for Dickson RSCCs, series-parallel RSCCs and Fibonacci RSCCs in FIGS. 8-10 is defined as:

$$M_2 = \frac{V_{LV}}{V_{HV}} \quad (15)$$

where the range of $M_2$ is 0 to the maximum voltage conversion ratio $M_{2\_max}$.

$$M_{2\_max} = \begin{cases} \frac{1}{n} \\ \frac{1}{f(n)} \quad \text{Fibonacci RSCCs} \end{cases} \quad (16)$$

The step-up voltage conversion ratio $M_3$ for ladder RSCCs, RTBSCs, Dickson RSCCs, series-parallel RSCCs and Fibonacci RSCCs in FIGS. 6-10 is defined as:

$$M_3 = \frac{V_{HV}}{V_{LV}} \quad (17)$$

where, the range of $M_3$ is 1 to the maximum voltage conversion ratio $M_{3\_max}$.

$$M_{3\_max} = \begin{cases} n \\ f(n) \quad \text{Fibonacci RSCCs} \end{cases} \quad (18)$$

Figure 12:
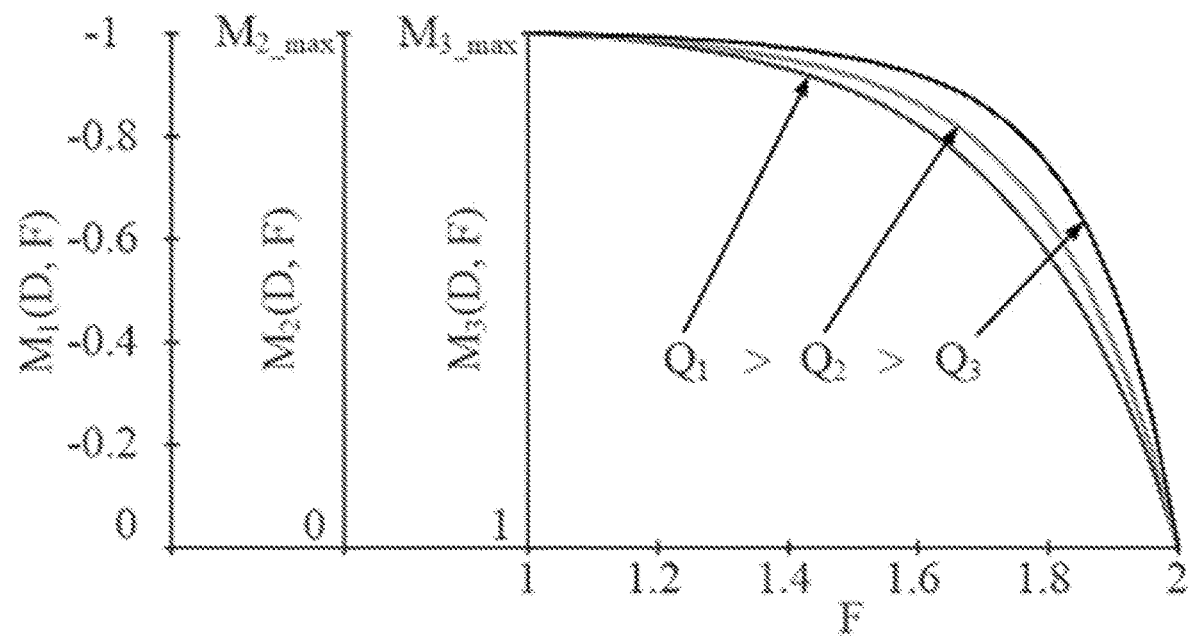
FIG. 12 illustrates examples of voltage gain curves for RSCCs without idle state operation, in accordance with various embodiments of the present disclosure.

FIG. 12 shows the voltage gain curves $M_1$ and $M_2$ for RSCCs in FIGS. 4, 5 and 8-10 by switching methods A and B. Full-range voltage regulation of $M_1$ from 0 to −1 is achieved for inverse polarity RSCC in FIG. 5 regardless of load level. Full-range voltage regulation of $M_2$ from 0 to $M_{2\_max}$ is achieved for RSCCs in FIGS. 4 and 8-10 regardless of load level. Meanwhile, FIG. 12 shows the voltage gain curves $M_1$ and $M_3$ for RSCCs for all the above mentioned RSCC circuits by switching methods H and I. Full-range voltage regulation of $M_1$ from 0 to −1 is achieved for inverse polarity RSCC in FIG. 5 regardless of load level. Full-range voltage regulation of $M_3$ from 1 to $M_{3\_max}$ is achieved for RSCCs in FIGS. 4 and 6-10 regardless of load level.

For illustration purpose, three Q levels in FIG. 12 are listed representing three different loads, respectively, where Q is related to the load. In reality, Q level can be from 0 to infinity. According to equation (12), the greater Q represents the heavier load condition. As an example, the switching frequency is variable and the range of frequency ratio F is 1 to 2. The duty cycle D is adjusted according to the variation of frequency ratio F. Correspondingly, the full-range duty cycle adjustment can be achieved for all loads with D varied from 0 to 0.5.

Figure 13:
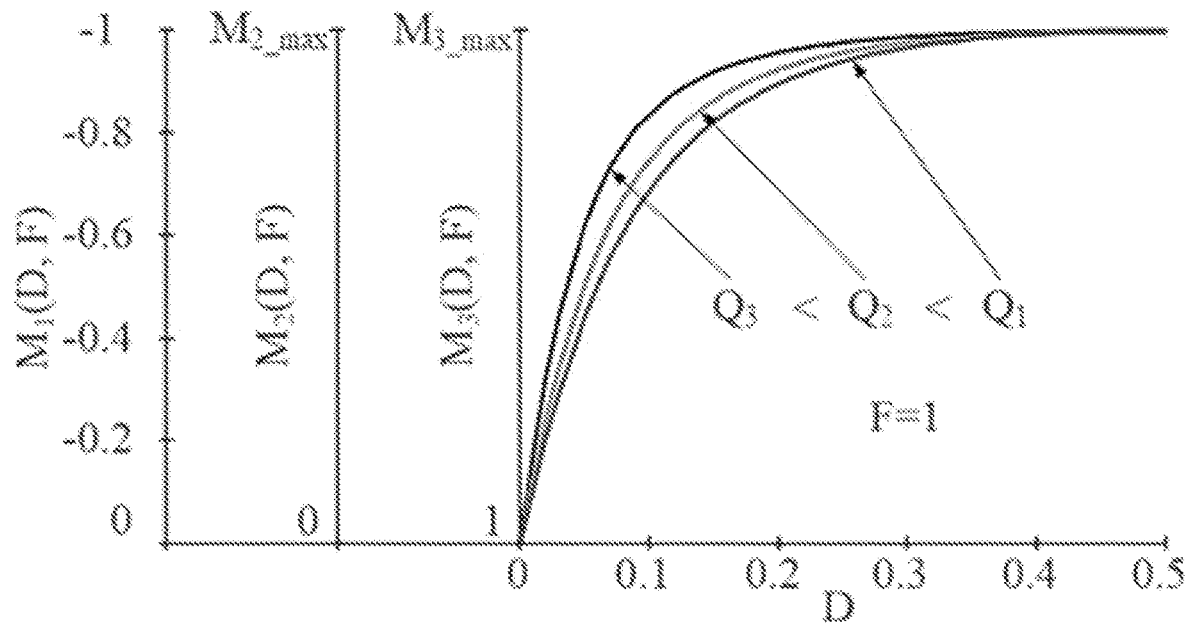
FIG. 13 illustrates examples of voltage gain curves for RSCCs with fixed switching frequency, in accordance with various embodiments of the present disclosure.

FIG. 13 shows the voltage gain curves $M_1$ and $M_2$ for RSCCs in FIGS. 4, 5 and 8-10 by switching methods C, D, E, F and G. Meanwhile, FIG. 13 shows the voltage gain curves $M_1$ and $M_3$ for RSCCs for all the above mentioned RSCC circuits by switching methods J, K, L, M and N. There are three Q levels in FIG. 13 for three different loads, respectively. According to equation (12), the greater Q represents the heavier load condition.

In FIG. 13, the switching frequency is fixed at the resonant frequency (F=1) as an example. The proposed switching methods C, D, E, F, G, J, K, L, M and N allow RSCCs to operate above, equal and below the resonant frequency (F>1, F=1 and F<1) by adjusting the duration of idle state 5. As shown, the duty cycle is adjusted from 0 to 0.5 regardless of load level. Correspondingly, full-range voltage regulation can be achieved for all above mentioned RSCCs regardless of load level.

Figure 14:
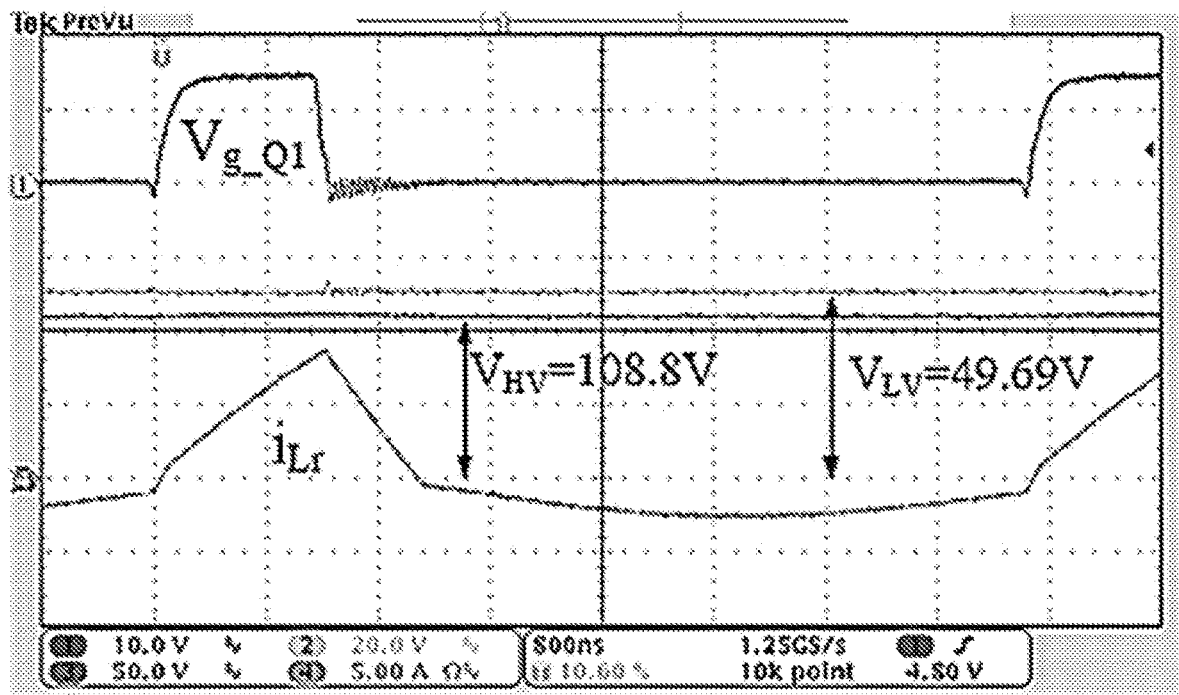
FIG. 14 illustrates an experimental result of a 3X ladder RSCC prototype using switching method H, in accordance with various embodiments of the present disclosure.

FIG. 14 shows the experiment result of a 3X ladder RSCC prototype using the proposed switching method H, when the RSCC operates at F=1.6 and D=0.2. The waveforms from top to bottom are the driving signal for switch $Q_1$, input voltage, output voltage and the inductor current, respectively. As shown, the input voltage $V_{LV}$=49.69V and the output voltage $V_{HV}$=108.8V. The experimental voltage conversion ratio is 2.19 compared to the $M_{3\_max}$=3.

Figure 15:
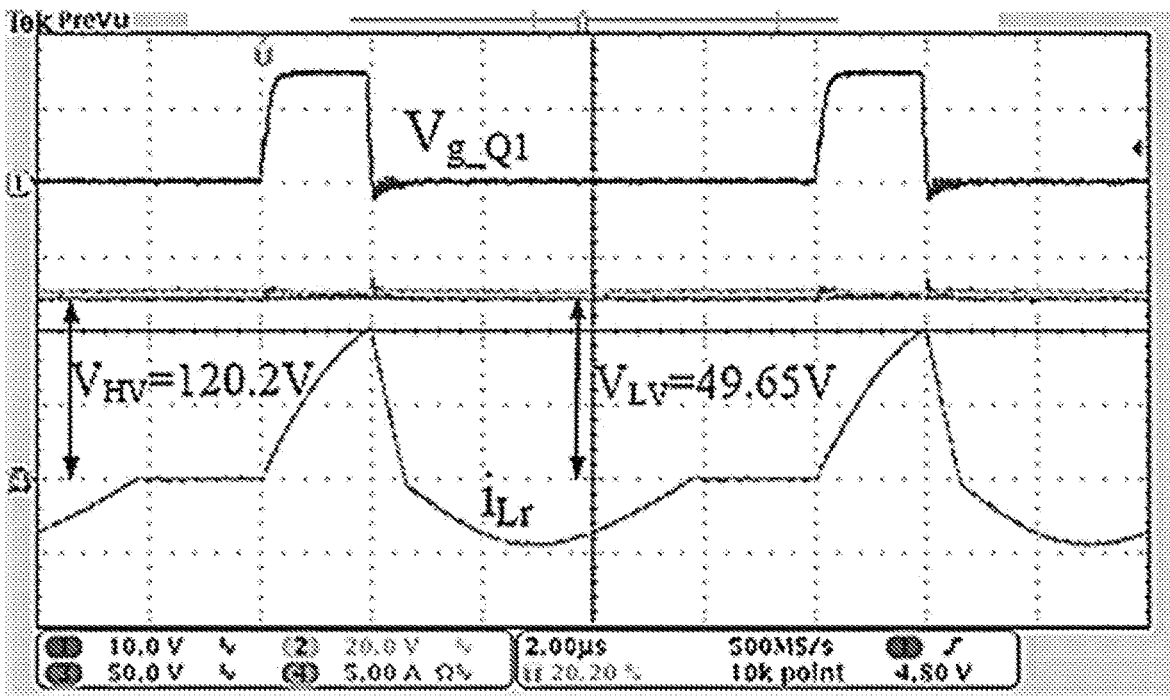
FIG. 15 illustrates an experimental result of a 3X ladder RSCC prototype using switching method J, in accordance with various embodiments of the present disclosure.

FIG. 15 shows the experiment result of a 3X ladder RSCC prototype by the proposed switching method J, when the RSCC operates at F=1, D=0.2. The waveforms from top to bottom are the driving signal for switch $Q_1$, input voltage, output voltage and the inductor current. As shown, the input voltage $V_{LV}$=49.65V and the output voltage $V_{HV}$=120.2V. The experimental voltage conversion ratio is 2.42 compared to the $M_{3\_max}$=3.

In various aspects, a switching method to achieve full-range regulation for RSCCs can comprise a switching sequence where each switching cycle is formed by a switching sequence of state 2, state 1, state 4 and state 3, where state 3 can be eliminated or minimized by the proposed switching method A. The conducting switches during the state 2, state 1, state 4 and state 3 are defined in the table of FIG. 11B.

In various aspects, a switching method to achieve full-range regulation for RSCCs can comprise a switching sequence where each switching cycle is formed by a switching sequence of state 2, state 1, state 4 and state 3, where state 1 can be eliminated or minimized by the proposed switching method B. The conducting switches during the state 2, state 1, state 4 and state 3 are defined in the table of FIG. 11B.

In various aspects, a switching method to achieve full-range regulation for RSCCs can comprise a switching sequence where each switching cycle is formed by a switching sequence of state 2, state 1, state 4 and state 5, where the duration of state 5 can be adjusted by the proposed switching method C. The conducting switches during the state 2, state 1, state 4 and state 5 are defined in the table of FIG. 11B.

In various aspects, a switching method to achieve full-range regulation for RSCCs can comprise a switching sequence where each switching cycle is formed by a switching sequence of state 2, state 5, state 4 and state 3, where the duration of state 5 can be adjusted by the proposed switching method D. The conducting switches during the state 2, state 5, state 4 and state 3 are defined in the table of FIG. 11B.

In various aspects, a switching method to achieve full-range regulation for RSCCs can comprise a switching sequence where each switching cycle is formed by a switching sequence of state 2, state 1, state 5 and state 4, where the duration of state 5 can be adjusted by the proposed switching method E. The conducting switches during the state 2, state 1, state 5 and state 4 are defined in the table of FIG. 11B.

In various aspects, a switching method to achieve full-range regulation for RSCCs can comprise a switching sequence where each switching cycle is formed by a switching sequence of state 2, state 4, state 3 and state 5, where the duration of state 5 can be adjusted by the proposed switching method F. The conducting switches during the state 2, state 4, state 3 and state 5 are defined in the table of FIG. 11B.

In various aspects, a switching method to achieve full-range regulation for RSCCs can comprise a switching sequence where each switching cycle is formed by a switching sequence of state 2, state 1, state 5, state 4, state 3 and state 5, where the duration of state 5 can be adjusted by the proposed switching method G. In addition, one of the idle states 5 can be eliminated by the method G. The conducting switches during the state 2, state 1, state 5, state 4 and state 3 are defined in the table of FIG. 11B.

In various aspects, a switching method to achieve full-range regulation for RSCCs can comprise a switching sequence where each switching cycle is formed by a switching sequence of state 4, state 1, state 2 and state 3, where state 3 can be eliminated or minimized by the proposed switching method H. The conducting switches during the state 4, state 1, state 2 and state 3 are defined in the table of FIG. 11B.

In various aspects, a switching method to achieve full-range regulation for RSCCs can comprise a switching sequence where each switching cycle is formed by a switching sequence of state 4, state 1, state 2 and state 3, where state 1 can be eliminated or minimized by the proposed switching method I. The conducting switches during the state 4, state 1, state 2 and state 3 are defined in the table of FIG. 11B.

In various aspects, a switching method to achieve full-range regulation for RSCCs can comprise a switching sequence where each switching cycle is formed by a switching sequence of state 4, state 1, state 2 and state 5, where the duration of state 5 can be adjusted by the proposed switching method J. The conducting switches during the state 4, state 1, state 2 and state 5 are defined in the table of FIG. 11B.

In various aspects, a switching method to achieve full-range regulation for RSCCs can comprise a switching sequence where each switching cycle is formed by a switching sequence of state 4, state 5, state 2 and state 3, where the duration of state 5 can be adjusted by the proposed switching method K. The conducting switches during the state 4, state 5, state 2 and state 3 are defined in the table of FIG. 11B.

In various aspects, a switching method to achieve full-range regulation for RSCCs can comprise a switching sequence where each switching cycle is formed by a switching sequence of state 4, state 1, state 5 and state 2, where the duration of state 5 can be adjusted by the proposed switching method L. The conducting switches during the state 4, state 1, state 5 and state 2 are defined in the table of FIG. 11B.

In various aspects, a switching method to achieve full-range regulation for RSCCs can comprise a switching sequence where each switching cycle is formed by a switching sequence of state 4, state 2, state 3 and state 5, where the duration of state 5 can be adjusted by the proposed switching method M. The conducting switches during the state 4, state 2, state 3 and state 5 are defined in the table of FIG. 11B.

In various aspects, a switching method to achieve full-range regulation for RSCCs can comprise a switching sequence where each switching cycle is formed by a switching sequence of state 4, state 1, state 5, state 2, state 3 and state 5, where the duration of state 5 can be adjusted by the proposed switching method N. In addition, one of the idle states 5 can be eliminated by the method N. The conducting switches during the state 4, state 1, state 5, state 2 and state 3 are defined in the table of FIG. 11B.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A method for switching a resonant switched-capacitor converter (RSCC), comprising:
operating switches of the RSCC in a repeated asymmetric sequence of switching states per switching cycle, the repeated asymmetric sequence of switching states comprising at least three switching states selected from a group consisting of five defined switching states, the five defined switching states including an idle state.

2. The method of claim 1, wherein the RSCC is a basic RSCC comprising switches $Q_1$, $Q_2$, $Q_3$ and $Q_4$ or an inverse polarity RSCC comprising switches $Q_1$, $Q_2$, $Q_3$ and $Q_4$, and for step-down conversion the repeated asymmetric sequence of switching states comprises states 2, 1 and 4 or states 2, 4 and 3, where switches $Q_2$ and $Q_3$ are ON in State 1, switches $Q_2$ and $Q_4$ are ON in State 2, switches $Q_1$ and $Q_4$ are ON in State 3, and switches $Q_1$ and $Q_3$ are ON in State 4.

3. The method of claim 1, wherein the RSCC is an n-stage Dickson RSCC comprising switches $Q_i$ where i=1, 2, 3, ..., 2n with n>1, and for step-down conversion the repeated asymmetric sequence of switching states comprises states 2, 1 and 4 or states 2, 4 and 3, where switches $Q_2$ and $Q_3$, ..., $Q_{2n-1}$ are ON in State 1, switches $Q_2$, ..., $Q_{2n}$ are ON in State 2, switches Q1 and $Q_4$, ..., $Q_{2n}$ are ON in State 3, and switches $Q_1$, ..., $Q_{2n-1}$ are ON in State 4.

4. The method of claim 1, wherein the RSCC is an n-stage series-parallel RSCC comprising switches $Q_i$ where i=1, 2, 3, ..., 3n−2 with n>2, and for step-down conversion the repeated asymmetric sequence of switching states comprises states 2, 1 and 4 or states 2, 4 and 3, where switches $Q_2$ and $Q_3$, ..., $Q_{3n-3}$ are ON in State 1, switches $Q_2$, $Q_4$ and $Q_6$, ..., $Q_{3n-3}$ are ON in State 2, switches $Q_1$, $Q_4$ and $Q_5$, ..., $Q_{3n-4}$ are ON in State 3, and switches $Q_1$, $Q_3$, $Q_5$, ..., $Q_{3n-4}$ and $Q_7$, ..., $Q_{3n-2}$ are ON in State 4.

5. The method of claim 1, wherein the RSCC is an n-stage Fibonacci RSCC comprising switches $QA_i$, $QB_j$ and $QC_j$ where i=1, 2, 3, ..., n and j=1, 2, ..., n−1 with n>3, and for step-down conversion the repeated asymmetric sequence of switching states comprises states 2, 1 and 4 or states 2, 4 and 3, where switches $QA_1$, $QA_3$, ..., $QB_1$, $QB_3$, ..., and $QC_2$, $QC_4$, ... are ON in State 1, switches $QA_2$, $QA_4$, ..., $QB_1$, $QB_3$, ..., and $QC_2$, $QC_4$, ... are ON in State 2, switches $QA_2$, $QA_3$, $QA_4$, ..., $QB_2$, $QB_4$, ..., and $QC_1$, $QC_3$, ... are ON in State 3, and switches $QA_1$, $QA_3$, ..., $QB_2$, $QB_4$, ..., and $QC_1$, $QC_3$, ... are ON in State 4.

6. The method of claim 2, wherein the repeated asymmetric sequence of switching states consists of states 2, 1, 4 and 3, or states 2, 1, 4 and 5, or states 2, 5, 4 and 3, or states 2, 1, 5 and 4, or states 2, 4, 3 and 5, where state 5 is the idle state.

7. The method of claim 1, wherein the RSCC is a basic RSCC comprising switches $Q_1$, $Q_2$, $Q_3$ and $Q_4$, and for step-up conversion the repeated asymmetric sequence of switching states comprises states 4, 1 and 2 or states 4, 2 and 3, where switches $Q_2$ and $Q_3$ are ON in State 1, switches $Q_2$ and $Q_4$ are ON in State 2, switches $Q_1$ and $Q_4$ are ON in State 3, and switches $Q_1$ and $Q_3$ are ON in State 4.

8. The method of claim 1, wherein the RSCC is an n-stage ladder RSCC comprising switches $Q_i$ where i=1, 2, 3, ..., 2n with n>1 or an n-stage Dickson RSCC comprising switches $Q_i$ where i=1, 2, 3, ..., 2n with n>1, and for step-up conversion the repeated asymmetric sequence of switching states comprises 4, 1 and 2 or states 4, 2 and 3, where switches $Q_2$ and $Q_3$, ..., $Q_{2n-1}$ are ON in State 1, switches $Q_2$, ..., $Q_{2n}$ are ON in State 2, switches Q1 and $Q_4$, ..., $Q_{2n}$ are ON in State 3, and switches $Q_1$, ..., $Q_{2n-1}$ are ON in State 4.

9. The method of claim 1, wherein the RSCC is an n-stage resonant two-switch boosting switched-capacitor converter (RTBSC) comprising switches $QP_i$ and $QN_i$ where i=1, 2, 3, ..., n with n=3, 5, 7, ..., and for step-up conversion the repeated asymmetric sequence of switching states comprises 4, 1 and 2 or states 4, 2 and 3, where switches $QP_1$, and $QP_2$, $QP_4$, ... and $QN_3$, $QN_5$, ... are ON in State 1, switches $QP_1$, $QP_3$, ... and $QN_2$, $QN_4$, ... are ON in State 2, switches $QP_3$, $QP_5$, ... and $QN_1$ and $QN_2$, $QN_4$, ... are ON in State 3, and switches $QP_2$, $QP_4$, ... and $QN_1$ and $QN_3$, $QN_5$, ... are ON in State 4.

10. The method of claim 1, wherein the RSCC is an n-stage series-parallel RSCC comprising switches $Q_i$ where i=1, 2, 3, ..., 3n−2 with n>2, and for step-up conversion the repeated asymmetric sequence of switching states comprises 4, 1 and 2 or states 4, 2 and 3, where switches $Q_2$ and $Q_3$, ..., $Q_{3n-3}$ are ON in State 1, switches $Q_2$, $Q_4$ and $Q_6$, ..., $Q_{3n-3}$ are ON in State 2, switches $Q_1$, $Q_4$ and $Q_5$, ..., $Q_{3n-4}$ are ON in State 3, and switches $Q_1$, $Q_3$, $Q_5$, ..., $Q_{3n-4}$ and $Q_7$, ..., $Q_{3n-2}$ are ON in State 4.

11. The method of claim 1, wherein the RSCC is an n-stage Fibonacci RSCC comprising switches $QA_i$, $QB_j$ and $QC_j$ where i=1, 2, 3, ..., n and j=1, 2, ..., n−1 with n>3, and for step-up conversion the repeated asymmetric sequence of switching states comprises 4, 1 and 2 or states 4, 2 and 3, where switches $QA_1$, $QA_3$, ..., $QB_1$, $QB_3$, ..., and $QC_2$, $QC_4$, ... are ON in State 1, switches $QA_2$, $QA_4$, ..., $QB_1$, $QB_3$, ..., and $QC_2$, $QC_4$, ... are ON in State 2, switches $QA_2$, $QA_3$, $QA_4$, ..., $QB_2$, QB$_4$, . . . , and QC$_1$, QC$_3$, . . . are ON in State 3, and switches QA$_1$, QA$_3$, . . . , QB$_2$, QB$_4$, . . . , and QC$_1$, QC$_3$, . . . are ON in State 4.

12. The method of claim 7, wherein the repeated asymmetric sequence of switching states consists of states 4, 1, 2 and 3, or states 4, 1, 2 and 5, or states 4, 5, 2 and 3, or states 4, 1, 5 and 2, or states 4, 2, 3 and 5, where state 5 is the idle state.

13. A method for switching a resonant switched-capacitor converter (RSCC), comprising:
    operating switches of the RSCC in a repeated sequence of switching states per switching cycle, the repeated sequence of switching states comprising six switching states selected from a group consisting of five defined switching states, where at least one of the five defined switching states occurs twice in the six switching states and the five defined switching states includes an idle state.

14. The method of claim 13, wherein the RSCC is a basic RSCC comprising switches $Q_1$, $Q_2$, $Q_3$ and $Q_4$ or an inverse polarity RSCC comprising switches $Q_1$, $Q_2$, $Q_3$ and $Q_4$, and for step-down conversion the repeated sequence of switching states comprises states 2, 1, 5, 4, 3 and 5, where switches $Q_2$ and $Q_3$ are ON in State 1, switches $Q_2$ and $Q_4$ are ON in State 2, switches $Q_1$ and $Q_4$ are ON in State 3, switches $Q_1$ and $Q_3$ are ON in State 4, and the switches are idle in State 5.

15. The method of claim 13, wherein the RSCC is an n-stage Dickson RSCC comprising switches $Q_i$ where i=1, 2, 3, . . . , 2n with n>1, and step-down conversion the repeated sequence of switching states comprises states 2, 1, 5, 4, 3 and 5, where switches $Q_2$ and $Q_3$, . . . , $Q_{2n-1}$ are ON in State 1, switches $Q_2$, . . . , $Q_{2n}$ are ON in State 2, switches $Q_1$ and $Q_4$, . . . , $Q_{2n}$ are ON in State 3, and switches $Q_1$, . . . , $Q_{2n-1}$ are ON in State 4, and the switches are idle in State 5.

16. The method of claim 13, wherein the RSCC is an n-stage series-parallel RSCC comprising switches $Q_i$ where i=1, 2, 3, . . . , 3n−2 with n>2, and for step-down conversion the repeated sequence of switching states comprises states 2, 1, 5, 4, 3 and 5, where switches $Q_2$ and $Q_3$, . . . , $Q_{3n-3}$ are ON in State 1, switches $Q_2$, $Q_4$ and $Q_6$, . . . , $Q_{3n-3}$ are ON in State 2, switches $Q_1$, $Q_4$ and $Q_5$, . . . , $Q_{3n-4}$ are ON in State 3, and switches $Q_1$, $Q_3$, $Q_5$, . . . , $Q_{3n-4}$ and $Q_7$, . . . , $Q_{3n-2}$ are ON in State 4, and the switches are idle in State 5.

17. The method of claim 13, wherein the RSCC is an n-stage Fibonacci RSCC comprising switches QA$_i$, QB$_j$ and QC$_j$ where i=1, 2, 3, . . . , n and j=1, 2, . . . , n−1 with n>3, and for step-down conversion the repeated sequence of switching states comprises states 2, 1, 5, 4, 3 and 5, where switches QA$_1$, QA$_3$, . . . , QB$_1$, QB$_3$, . . . , and QC$_2$, QC$_4$, . . . are ON in State 1, switches QA$_2$, QA$_4$, . . . , QB$_1$, QB$_3$, . . . , and QC$_2$, QC$_4$, . . . are ON in State 2, switches QA$_2$, QA$_3$, QA$_4$, . . . , QB$_2$, QB$_4$, . . . , and QC$_1$, QC$_3$, . . . are ON in State 3, and switches QA$_1$, QA$_3$, . . . , QB$_2$, QB$_4$, . . . , and QC$_1$, QC$_3$, . . . are ON in State 4, and the switches are idle in State 5.

18. The method of claim 13, wherein the RSCC is a basic RSCC comprising switches $Q_1$, $Q_2$, $Q_3$ and $Q_4$, and for step-up conversion the repeated sequence of switching states comprises states 4, 1, 5, 2, 3 and 5, where switches $Q_2$ and $Q_3$ are ON in State 1, switches $Q_2$ and $Q_4$ are ON in State 2, switches $Q_1$ and $Q_4$ are ON in State 3, and switches $Q_1$ and $Q_3$ are ON in State 4, and the switches are idle in State 5.

19. The method of claim 13, wherein the RSCC is an n-stage ladder RSCC comprising switches $Q_i$ where i=1, 2, 3, . . . , 2n with n>1 or an n-stage Dickson RSCC comprising switches $Q_i$ where i=1, 2, 3, . . . , 2n with n>1, and for step-up conversion the repeated sequence of switching states comprises states 4, 1, 5, 2, 3 and 5, where switches $Q_2$ and $Q_3$, . . . , $Q_{2n-1}$ are ON in State 1, switches $Q_2$, . . . , $Q_{2n}$ are ON in State 2, switches $Q_1$ and $Q_4$, . . . , $Q_{2n}$ are ON in State 3, and switches $Q_1$, . . . , $Q_{2n-1}$ are ON in State 4, and the switches are idle in State 5.

20. The method of claim 13, wherein the RSCC is an n-stage resonant two-switch boosting switched-capacitor converter (RTBSC) comprising switches QP$_i$ and QN$_i$ where i=1, 2, 3, . . . , n with n=3, 5, 7, . . . , and for step-up conversion the repeated sequence of switching states comprises states 4, 1, 5, 2, 3 and 5, where switches QP$_1$, and QP$_2$, QP$_4$, . . . and QN$_3$, QN$_5$, . . . are ON in State 1, switches QP$_1$, QP$_3$, . . . and QN$_2$, QN$_4$, . . . are ON in State 2, switches QP$_3$, QP$_5$, . . . and QN$_1$ and QN$_2$, QN$_4$, . . . are ON in State 3, and switches QP$_2$, QP$_4$, . . . and QN$_1$ and QN$_3$, QN$_5$, . . . are ON in State 4, and the switches are idle in State 5.

21. The method of claim 13, wherein the RSCC is an n-stage series-parallel RSCC comprising switches $Q_i$ where i=1, 2, 3, . . . , 3n−2 with n>2, and for step-up conversion the repeated sequence of switching states comprises states 4, 1, 5, 2, 3 and 5, where switches $Q_2$ and $Q_3$, . . . , $Q_{3n-3}$ are ON in State 1, switches $Q_2$, $Q_4$ and $Q_6$, . . . , $Q_{3n-3}$ are ON in State 2, switches $Q_1$, $Q_4$ and $Q_5$, . . . , $Q_{3n-4}$ are ON in State 3, and switches $Q_1$, $Q_3$, $Q_5$, . . . , $Q_{3n-4}$ and $Q_7$, . . . , $Q_{3n-2}$ are ON in State 4, and the switches are idle in State 5.

22. The method of claim 13, wherein the RSCC is an n-stage Fibonacci RSCC comprising switches QA$_i$, QB$_j$ and QC$_j$ where i=1, 2, 3, . . . , n and j=1, 2, . . . , n−1 with n>3, and for step-up conversion the repeated sequence of switching states comprises states 4, 1, 5, 2, 3 and 5, where switches QA$_1$, QA$_3$, . . . , QB$_1$, QB$_3$, . . . , and QC$_2$, QC$_4$, . . . are ON in State 1, switches QA$_2$, QA$_4$, . . . , QB$_1$, QB$_3$, . . . , and QC$_2$, QC$_4$, . . . are ON in State 2, switches QA$_2$, QA$_3$, QA$_4$, . . . , QB$_2$, QB$_4$, . . . , and QC$_1$, QC$_3$, . . . are ON in State 3, and switches QA$_1$, QA$_3$, . . . , QB$_2$, QB$_4$, . . . , and QC$_1$, QC$_3$, . . . are ON in State 4, and the switches are idle in State 5.

* * * * *